United States Patent
Kreis et al.

(10) Patent No.: US 12,412,340 B2
(45) Date of Patent: Sep. 9, 2025

(54) SYNTHESIZING THREE-DIMENSIONAL SHAPES USING LATENT DIFFUSION MODELS IN CONTENT GENERATION SYSTEMS AND APPLICATIONS

(71) Applicant: Nvidia Corporation, Santa Clara, CA (US)

(72) Inventors: Karsten Julian Kreis, Vancouver (CA); Xiaohui Zeng, Toronto (CA); Arash Vahdat, San Mateo, CA (US); Francis Williams, Brooklyn, NY (US); Zan Gojcic, Zurich (CH); Or Litany, Sunnyvale, CA (US); Sanja Fidler, Toronto (CA)

(73) Assignee: Nvidia Corporation, Santa Clara, CA (US)

( * ) Notice: Subject to any disclaimer, the term of this patent is extended or adjusted under 35 U.S.C. 154(b) by 210 days.

(21) Appl. No.: 18/320,716

(22) Filed: May 19, 2023

(65) Prior Publication Data

US 2024/0005604 A1 Jan. 4, 2024

Related U.S. Application Data

(60) Provisional application No. 63/344,004, filed on May 19, 2022.

(51) Int. Cl.
*G06T 17/20* (2006.01)
*G06V 10/44* (2022.01)

(52) U.S. Cl.
CPC .............. *G06T 17/20* (2013.01); *G06V 10/44* (2022.01)

(58) Field of Classification Search
CPC ................. G06T 17/20; G06T 2210/56; G06T 2219/2021; G06T 19/20; G06V 10/44; G06V 10/82; G06V 20/64
See application file for complete search history.

(56) References Cited

U.S. PATENT DOCUMENTS

2021/0004645 A1* 1/2021 Chaudhuri .............. G06F 17/16
2023/0237725 A1* 7/2023 Zoss ....................... G06T 13/40
345/419

OTHER PUBLICATIONS

Shitong Luo and Wei Hu. Diffusion probabilistic models for 3d point cloud generation. In Proceedings of the IEEE/CVF Conference on Computer Vision and Pattern Recognition (CVPR), 2021.*

* cited by examiner

*Primary Examiner* — Sultana M Zalalee
(74) *Attorney, Agent, or Firm* — Hogan Lovells US LLP

(57) ABSTRACT

Approaches presented herein provide for the unconditional generation of novel three dimensional (3D) object shape representations, such as point clouds or meshes. In at least one embodiment, a first denoising diffusion model (DDM) can be trained to synthesize a 1D shape latent from Gaussian noise, and a second DDM can be trained to generate a set of latent points conditioned on this 1D shape latent. The shape latent and set of latent points can be provided to a decoder to generate a 3D point cloud representative of a random object from among the object classes on which the models were trained. A surface reconstruction process may be used to generate a surface mesh from this generated point cloud. Such an approach can scale to complex and/or multimodal distributions, and can be highly flexible as it can be adapted to various tasks such as multimodal voxel- or text-guided synthesis.

20 Claims, 17 Drawing Sheets

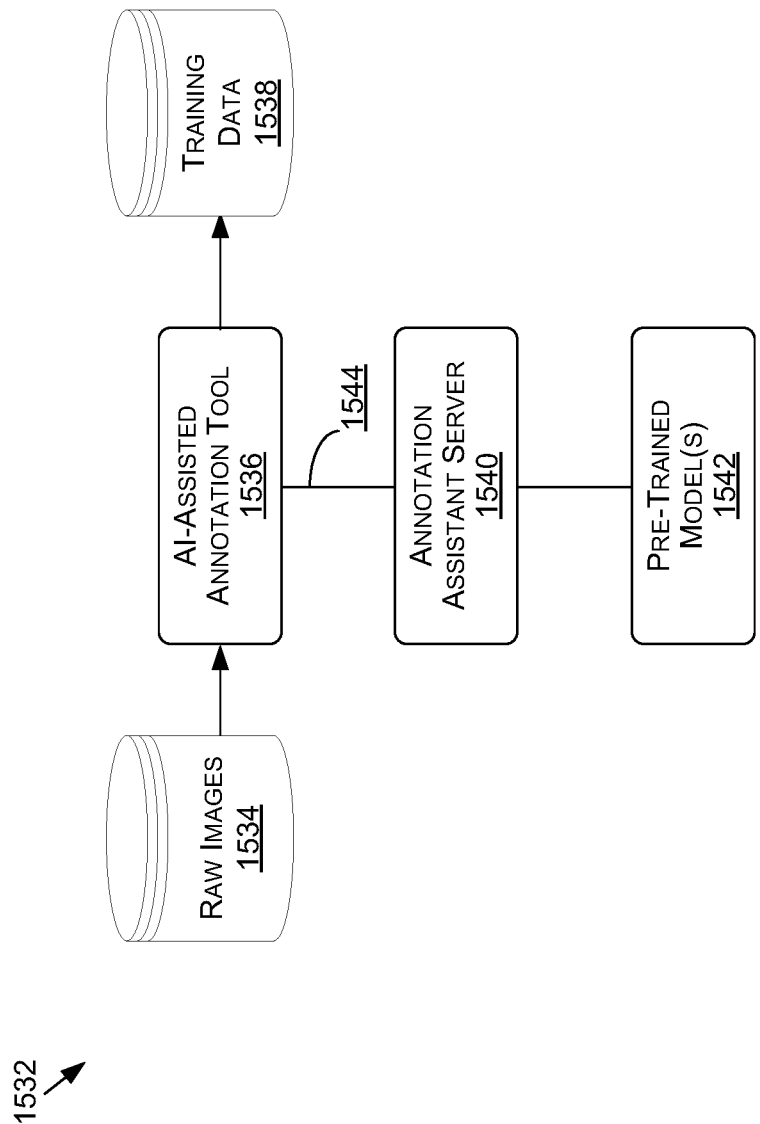

SYNTHESIZING THREE-DIMENSIONAL SHAPES USING LATENT DIFFUSION MODELS IN CONTENT GENERATION SYSTEMS AND APPLICATIONS

CROSS-REFERENCE TO RELATED APPLICATION

This application claims priority to, and the benefit of, U.S. Provisional Patent Application No. 63/344,004, filed May 19, 2022, titled "HIERARCHICAL LATENT DIFFUSION MODELS FOR 3D SHAPE SYNTHESIS WITH POINT CLOUDS," the full disclosure of which is hereby incorporated in its entirety for all purposes.

BACKGROUND

In various applications—such as for animation or video game creation, for example—there can be a need to generate images or other representations of diverse or unique objects of one or more object classes. This can include generating a representation of the shape of a three-dimensional (3D) object, such as a 3D point cloud for each generated object. Generative models have been used previously to generate such representations, but these approaches primarily attempt to diffuse points that directly describe the shape of a surface, which can be a difficult task since a point cloud will often need to be modeled very accurately. Furthermore, different ways of conditioning can only be realized by training entirely new models. Other approaches use adversarial training methods to build such 3D generative models, but adversarial training—particularly when trained directly with three-dimensional training data—can be unstable, is not easily scalable, and can lack diversity in the generated results.

BRIEF DESCRIPTION OF THE DRAWINGS

Various embodiments in accordance with the present disclosure will be described with reference to the drawings, in which:

FIGS. 15A and 15B illustrate a data flow diagram for a process to train a machine learning model, as well as client-server architecture to enhance annotation tools with pre-trained annotation models, in accordance with at least one embodiment.

DETAILED DESCRIPTION

Figure 1:
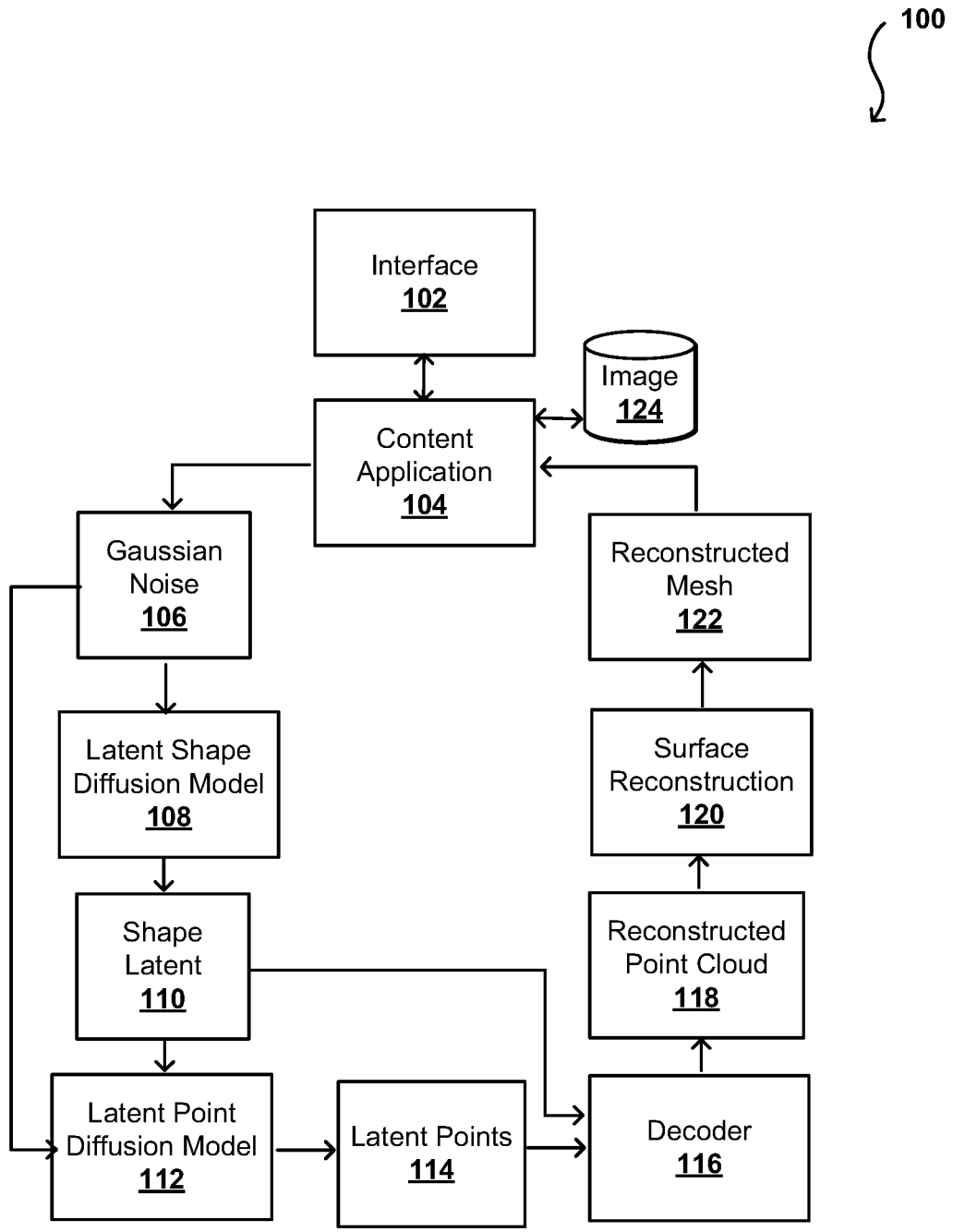
FIG. 1 illustrates an example system for generating a shape representation for a three-dimensional object, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

The systems and methods described herein may be used by, without limitation, non-autonomous vehicles, semi-autonomous vehicles (for example, in one or more advanced driver assistance systems ("ADAS")), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training or updating, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, generative AI with large language models ("LLMs"), light transport simulation (for example, ray-tracing, path tracing, etc.), collaborative content creation for three-dimensional ("3D") assets, cloud computing and/or any other suitable applications.

Disclosed embodiments may be comprised in a variety of different systems such as automotive systems (for example, a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more Virtual Machines ("VMs"), systems for performing synthetic data generation operations, systems implemented at least partially in a data center, systems for performing conversational AI operations, systems for performing generative AI operations using LLMs, systems for performing light transport simulation, systems for performing collaborative content creation for 3D assets, systems implemented at least partially using cloud computing resources, and/or other types of systems.

In at least one embodiment, unconditional generation of three dimensional object shapes can be performed to generate, for example and without limitation, points clouds representative of the 3D shapes of random objects from any of multiple object classes for which a generative diffusion model has been trained. In at least one embodiment, a hierarchical variational autoencoder (VAE) is trained on input 3D point cloud data to encode a 1D shape latent (as an abstract global shape representation) and a set of latent points in two respective latent spaces. The shape latent and latent point data can be provided as input to a decoder to generate a reconstructed point cloud. The 1D shape latent and set of latent points can be used as training data to train a pair of generative diffusion models. A first denoising diffusion model (DDM) can be trained to synthesize a 1D shape latent from Gaussian noise, for example, and a second DDM can be trained to generate a set of latent points (or latent point cloud). A shape latent and a set of latent points generated from these diffusion models at inference time can be provided to a trained decoder to generate a point cloud representative of a random 3D object from among the various object classes. A surface reconstruction process may then be used in some embodiments to generate a smooth surface or surface mesh from this generated point cloud, which can be used to render a 2D image of that object. In at least one embodiment, such a generative model can be used for 3D shape synthesis by operating on point clouds using a hierarchical VAE framework with latent DDMs. Such an approach can achieve high-quality and diverse 3D shape synthesis over many classes without conditioning. The point clouds generated using such a process can be used with a surface reconstruction process to generate an accurate mesh representation of the corresponding object, which may be useful for rendering or other such content generation operations. Such an approach can scale to handle complex and/or multimodal distributions. Such a framework can also be highly flexible, as it can be adapted to various tasks such as multimodal voxel-guided synthesis.

Variations of this and other such functionality can be used as well within the scope of the various embodiments as would be apparent to one of ordinary skill in the art in light of the teachings and suggestions contained herein.

Approaches in accordance with various illustrative embodiments provide for an efficient and accurate content generation process. FIG. 1 illustrates an example content generation system 100 that can be used in accordance with at least one embodiment. In this example, an instruction (or request, etc.) to generate an instance of content can be received to an interface 102, such as a graphical user interface (GUI) of a client device or an application programming interface (API) exposed by a server, among other such options. The instruction can be directed to a content application 104, which can use one or more generative models to generate image data or other such content in response to the instruction. In this example, a pair of generative diffusion model 108, 112 is used to generate the content, which can correspond to a point cloud or geometric mesh representative of a random three-dimensional (3D) object of one or more classes, among other such content forms. The content application 104 in this example can provide "random" noise, such as Gaussian noise 106, as input to a first denoising diffusion model (or other such generative model as discussed and suggested elsewhere herein). The first DDM in this example is a latent shape diffusion model 108, which can take the noise as input and attempt to "denoise" the input—such as a random noise image or representation—over a number of denoising iterations. In at least one embodiment, a DDM can slowly perturb data during a forward diffusion process used to gradually denoise. In one or more embodiments, synthesis can include solving a differential equation (DE) defined by the learned model. Solving the DE can take advantage of iterative solvers for high-quality generation. A result of the denoising process for this latent shape diffusion model 108 can be a one-dimensional (1D) shape latent 110, or fixed length latent vector. The shape latent 110 can be a lightweight, abstract global representation of the shape of an object of a class for which the latent shape diffusion model 108 was trained. In at least one embodiment, a different or novel object shape latent 110 will be generated by the latent shape diffusion model 108 for each different random noise input that is provided.

In this example, the shape latent 110 can be provided along with random Gaussian noise 106 as input to a second denoising diffusion model. In such a scenario, a latent point diffusion model 112. The latent point diffusion model 112 can use the shape latent 110 as a guide or condition when denoising the input Gaussian noise to generate a set of latent feature points 114 that are representative of the 3D shape of the object corresponding to the input shape latent. The latent spaces for the shape latent and the latent points can both be regularized such that all encodings approximately fall under a simple, standard Normal distribution. The latent points 114 can be provided, along with the shape latent 110, as input to a latent decoder 116 (check on shadows for certain blocks). The latent decoder 116 can take the input 1D vector shape latent 110 together with the set of latent points 114 and can map these encodings back to the original 3D surface points, such as by using a selected reconstruction objective. This decoding process can generate an accurate (reconstructed) point cloud 118 that is representative of a random object of a type for which the diffusion models were trained, and as was guided by the initial shape latent 110. While the use of a second, latent shape diffusion model may require some additional overhead or cost relative to only using a latent point diffusion model, the size of the latent shape diffusion model will typically be much smaller than the size of the latent point diffusion model and will only require a small amount of additional overhead, but the ability to condition the latent point diffusion model using a shape latent produced by this additional latent shape diffusion model can significantly reduce training time and improve results at inference time. As discussed elsewhere herein, such an approach can also be used with other type of input to help guide the synthesis to support the selection of certain types of objects or object refinements, among other such operations.

In embodiments where a representation of a specific type of object is to be generated, a specific shape latent can be provided that can guide subsequent generation or synthesis. In some embodiments this point cloud 118 may be stored or used for various purposes. In this example, the point cloud 118 can be provided as input to a surface reconstruction model 120, such as may implement a shape as points (SAP) reconstruction approach. The surface reconstruction module 120 can produce a (reconstructed) three-dimensional mesh 122 of the object, which can be used with a texture during a rendering process to render one or more image views (or other image representations) of the object. In this example, the generated mesh 122 can be provided to the content application 104, which can perform an operation with the content corresponding to the received instruction or request, such as to render content for presentation, use the mesh to generate content for presentation—such as for playback on a display, projection, or virtual reality (VR)/augmented reality (AR)/mixed reality (MR) experience, or store the content to an image data repository 124 for subsequent usage, among other such options.

Denoising diffusion models (DDMs) can be used advantageously in such a system or process to synthesize content, such as three-dimensional (3D) point clouds, with high generation quality, flexibility for manipulation and applications such as conditional synthesis and shape interpolation, and the ability to output smooth surfaces or meshes needed for digital artistry and other such operations. In at least one embodiment, a latent point diffusion model (referred to herein as "LION") can be used for such operations. A LION model can take the form of a variational autoencoder (VAE) operating in a latent space that combines a global shape latent representation with a point-structured latent space. For content generation, two separate DDMs can be trained in these latent spaces. A dual (or hierarchical) VAE-based approach can improve performance with respect to DDMs that operate on point clouds directly, while the point-structured latents can remain well-suited for DDM-based modeling. LION has been observed to achieve state-of-the-art generation performance on multiple ShapeNet benchmarks. Furthermore, such a VAE framework allows for use to perform various relevant tasks without re-training the latent DDMs. LION has been observed to excel at tasks such as multimodal shape denoising and voxel-conditioned synthesis, as well as shape autoencoding and latent shape interpolation. LION can be used with a variety of surface reconstruction techniques to generate smooth 3D meshes.

3D generative models can be built on various frameworks, such as may include (without limitation) generative adversarial networks (GANs), variational autoencoders (VAEs), normalizing flows, or autoregressive models, among others. Denoising diffusion models (DDMs) can also be deployed as powerful generative models, achieving outstanding results not only on image synthesis but also for operations such as point cloud-based 3D shape generation. In DDMs, the data is gradually perturbed by a diffusion process, while a deep neural network is trained to denoise. This network can then be used to synthesize novel data in an iterative fashion when initialized from random noise, such as may be provided through an input Gaussian noise image. However, prior DDM-based approaches for 3D shape synthesis struggle with satisfying all criteria for practically useful 3D generative models.

Denoising diffusion models (DDMs) provide benefits in such operations at least because they can offer high synthesis quality and sample diversity in combination with a robust and scalable learning objective. DDMs can be used for operations including, but not limited to, image and video synthesis, super-resolution deblurring, image editing and inpainting text-to-image synthesis, conditional and semantic image generation, and image-to-image translation, as well as for inverse problems in medical imaging. DDMs can also enable high-quality speech synthesis, 3D shape generation, molecular modeling, maximum likelihood training, and more. In DDMs, a diffusion process gradually perturbs the data towards random noise, while a deep neural network learns to denoise. Formally, the problem can be reduced to learning the score function, or the gradient of the log-density of the perturbed data. The (approximate) inverse of the forward diffusion can be described by an ordinary differential equation (ODE) or a stochastic differential equation (SDE), defined by the learned score function, and can therefore be used for generation when starting from random noise.

While such generative modeling of 3D shapes can have extensive applications in 3D content creation, to be useful as a tool for digital artists the generative models of 3D shapes may need to satisfy one or more criteria. For example, generated shapes may need to be realistic and of high-quality without artifacts. The model used should enable flexible and interactive use and refinement, such as where a user may want to refine a generated shape and synthesize versions with varying details. Similarly, a user such as an artist may want to provide a coarse or noisy input shape, thereby guiding the model to produce multiple realistic high-quality outputs, or may want to interpolate different shapes. In some instances, it may be desirable for the model to output smooth meshes, which are used as standard representation in various graphics applications.

Figure 2:
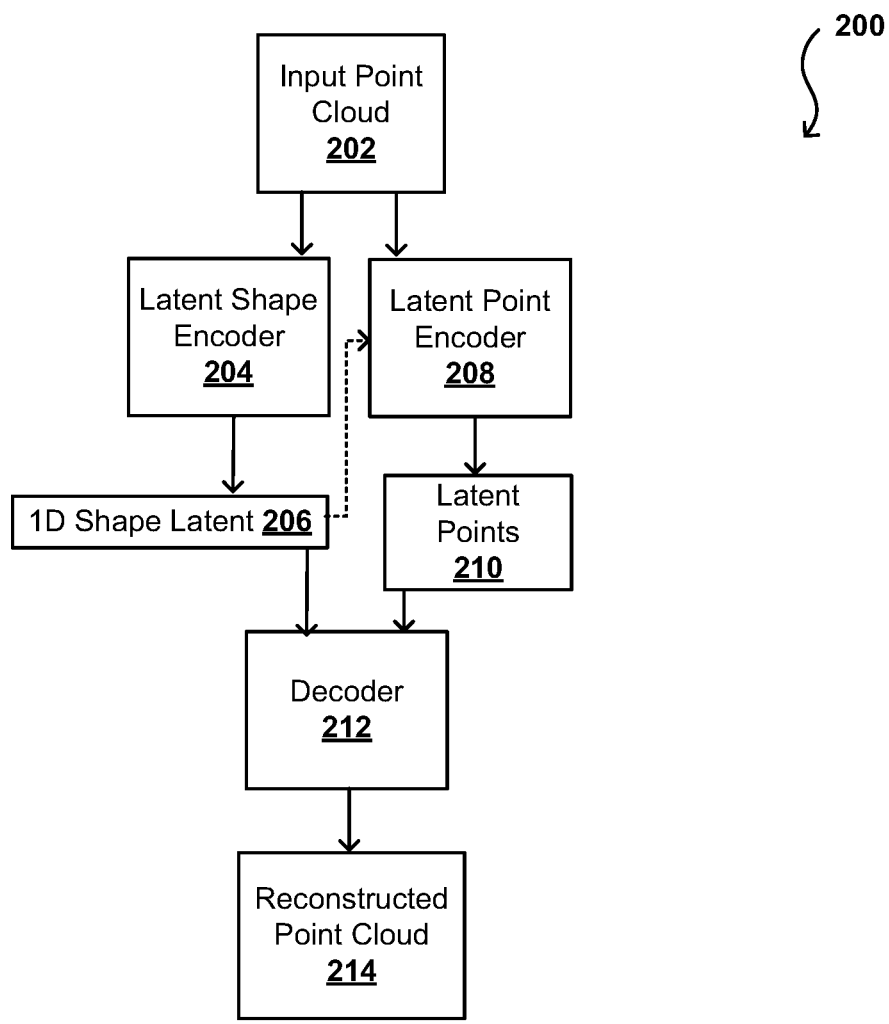
FIG. 2 illustrates a system for generating a shape latent and set of latent points for an input point cloud, according to at least one embodiment.

In at least one embodiment, a DDM-based generative model of 3D shapes according to at least one embodiment can achieve at least some of these goals and/or overcome at least some of the limitations with prior synthesis approaches including, but not limited to, those discussed herein. A model such as LION can be used for operations such as high quality 3D shape generation. FIG. 2 illustrates an example system 200 useful in a LION-based system, according to at least one embodiment. This example illustrates a pair of point cloud processing encoders 204, 208 and a point cloud generating decoder 212, as may be part of a variational autoencoder (VAE)-based implementation. In at least one embodiment, the encoders and decoders are point-voxel convolutional neural networks (PVCNNs), or other point cloud-based encoders, which can be used with adaptive group normalization. The system 200 of FIG. 2 can be used to generate training data for a pair of denoising diffusion models, such as those discussed with respect to FIG. 1. This system can also be used to train the decoder 212 to generate accurate synthesized output. As illustrated, this system 200 during training can take (e.g., for each training instance, during a training phase) a point cloud 202 as input, where that point cloud is representative of a three-dimensional object. In at least one embodiment, the three dimensional object may be of an object class, or one of a set of object classes, for which the models are being trained. For example, the object may be selected from a vehicle class or animal class, among other such class options. The input point cloud 202 can be provided as input to a latent shape encoder 204 that can generate a one-dimensional (1D) shape latent representative of the shape of the object represented by the input point cloud. In at least one embodiment, this can be a vector-valued global shape latent, such as may be represented by a 1D latent vector encoded in a latent space. The input point cloud 202 can also be provided, concurrently or otherwise, as input to a latent point encoder 208 that can generate a set of latent feature points 210 representative of the object. The latent points 210 will include feature points, representative of the object, encoded into a latent space, and this smaller number of latent feature points can be interpreted as a smoothed version of the input point cloud 202. As will be discussed in more detail later herein, the 1D shape latent 206 and latent points 210 can be used to train a pair of generative models, such as denoising diffusion models, to generate a 1D shape latent and set of latent points from input noise (or other such input).

As illustrated, such a system can encode information for an input point cloud into a latent space. A decoder 212, such as a PVCNN of a VAE architecture, can take these latent representations as input to generate a 3D output representation. In this example, the decoder 212 can take the 1D shape latent 206 and set of latent points 210 as input. As mentioned, the shape latent 206 is a lightweight representation of the shape of the input point cloud, which can be designed to be as compact as possible. The set of latent points 210 can provide a "smoother" representation of the input point cloud. The decoder can decode this information in latent space to generate a reconstructed point cloud 214. During training of the decoder 212, the reconstructed point cloud 214 can be compared against the input point cloud 202 using an appropriate loss function to calculate the loss, then network parameters of the decoder can be adjusted to attempt to reduce the overall loss during decoding or synthesis. Once the decoder is determined to be sufficiently trained, such as when at least one training criterion is satisfied, the decoder can be provided for inferencing. The autoencoder neural networks can be trained directly on 3D point cloud data using standard deep learning training techniques and optimizers. Furthermore, the neural network architectures can use standard point cloud processing neural network layers, such as PointNets and convolutions for point clouds.

Figure 3A:
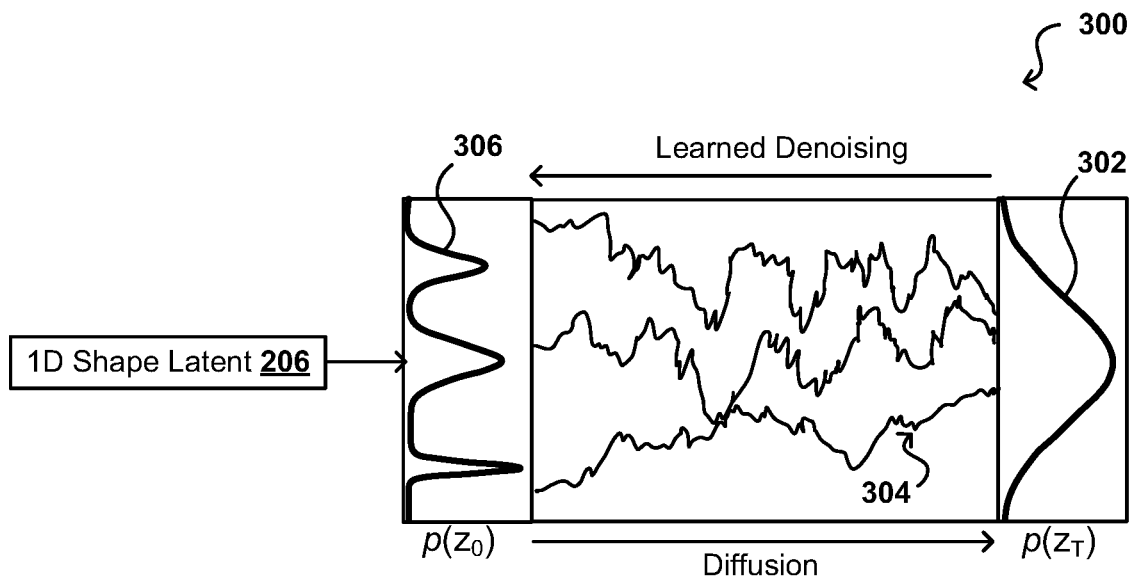
FIGS. 3A and 3B illustrate use of a shape latent and set of latent points in training a pair of denoising diffusion models, according to at least one embodiment.

As mentioned, a pair of denoising diffusion networks (DDMs) can be trained in these latent spaces. The DDMs can model the distribution of the global encodings, as well as the distribution of the local point-structured encodings conditioned on the global encodings. Novel three-dimensional point clouds can be synthesized from random, semi-random, or guiding input (e.g., noisy point clouds or coarse voxel representations) using these diffusion models. As illustrated in FIG. 3A, a first DDM 300 can take Gaussian noise 302 as input and generate output corresponding to a shape latent. During training, this inferred shape latent 306 can be compared against a 1D shape latent 206 generated from a system such as that described with respect to FIG. 2, and parameters of this first DDM adjusted to attempt to reduce a corresponding loss value. In at least one embodiment, a 1D shape latent can be sampled from a latent space in which the shape latents from the decoder training process were encoded, and this sample (with the corresponding set of latent points) can be used as the training target or ground truth. A number of different denoising paths 304 are illustrated that represent iterative denoising steps performed during the denoising process. In another example training process, the 1D shape latent 206 can be provided to the shape latent DDM 300 as input 306, and a diffusion process can attempt to learn the denoising path through an iterative diffusion process to attempt to arrive at a Gaussian curve 302 as output, effectively running the network backwards for training purposes.

Figure 3B:
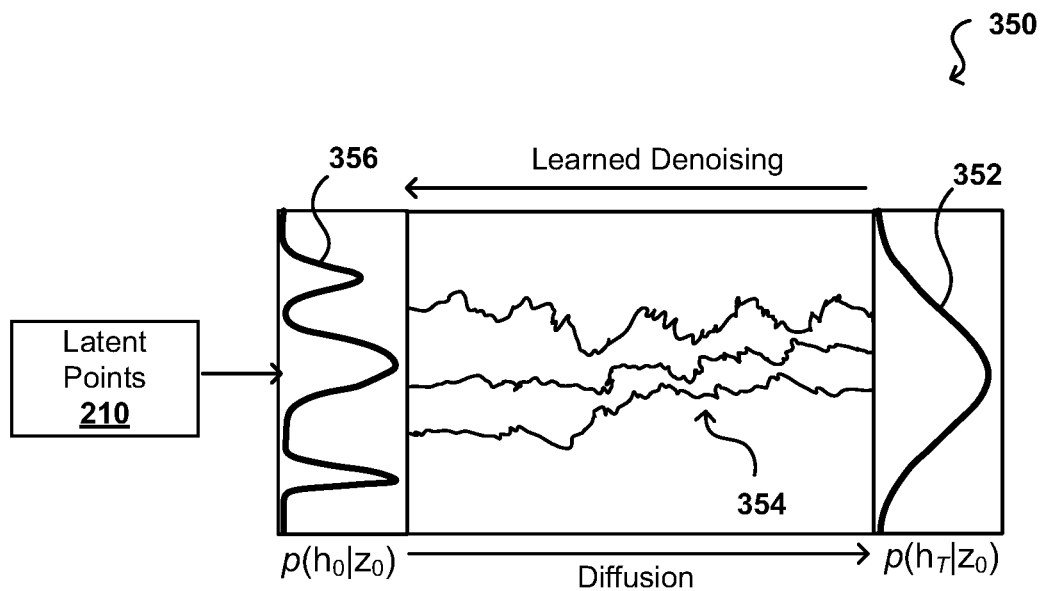

FIG. 3B illustrates a similar training approach that can be used with a latent point DDM 350 according to at least one embodiment. The latent point DDM can be trained to infer data 356 representative of a set of latent points by following a learned denoising path 354 from input noise, such as Gaussian noise 352. A set of latent points 210 generated using a system such as that described with respect to FIG. 2 can be used as training data for the process. Although not illustrated in this example, in at least one embodiment the 1D shape latent 206 can be provided along with Gaussian noise 352 as input to the latent point DDM 350, where the shape latent 206 can help to guide or determine the appropriate learned denoising path to follow in order to generate the appropriate set of latent points during training, which can then be compared against the set of latent points 210 corresponding to the 1D shape latent, or that is representative of the same object as the 1D shape latent. In at least one embodiment, such an approach to training these diffusion models is easier than training diffusion models directly on point cloud data, at least in part because the latent spaces of the model have been regularized to be at least relatively smooth.

Figure 4:
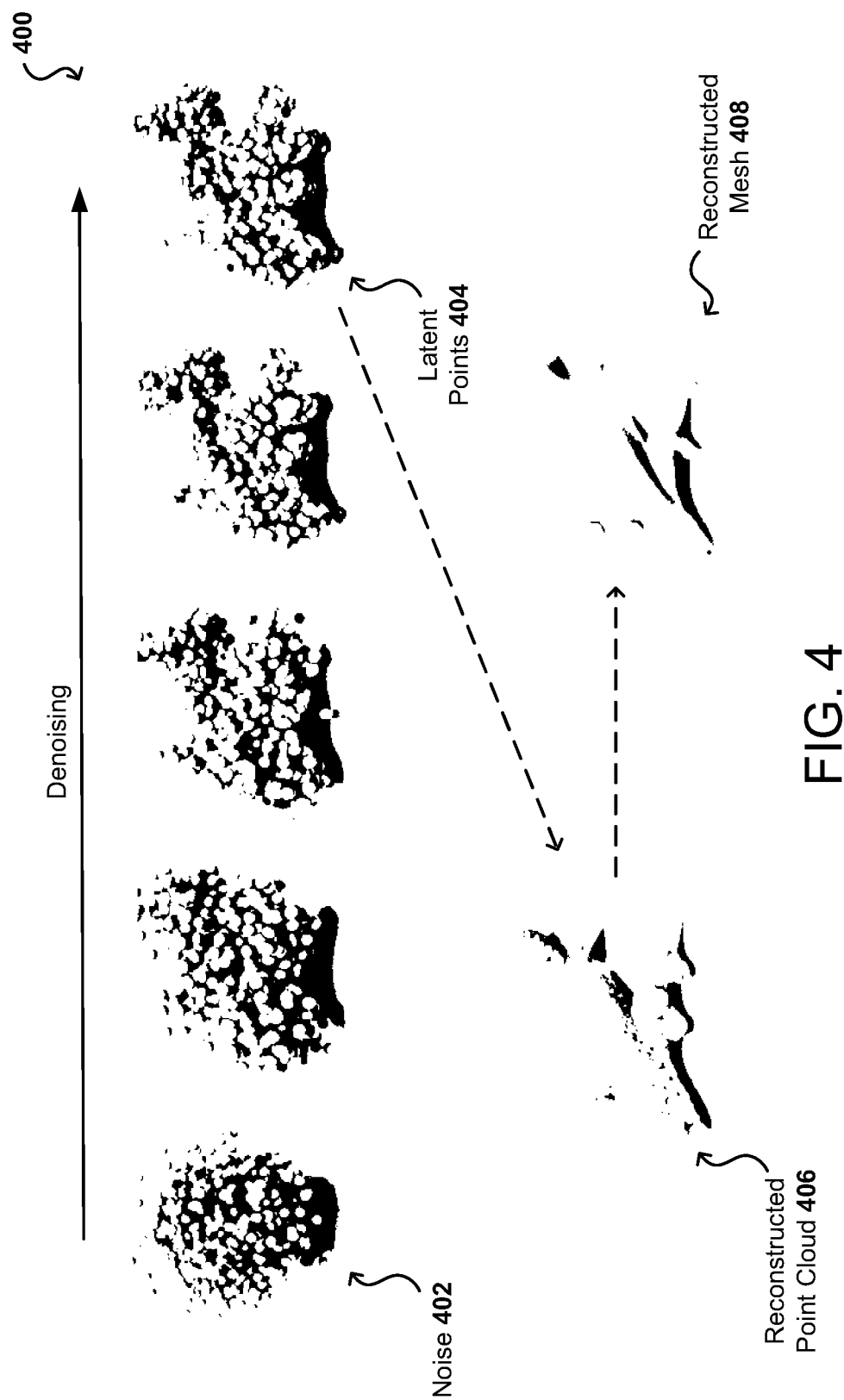
FIG. 4 illustrates data generated during synthesis of a geometric mesh for a three-dimensional object, according to at least one embodiment.

At inference time, the trained VAE and DDMs can be used to synthesize accurate point clouds for random objects, at least from the object classes on which these models or networks were trained. This can include drawing one or more latent samples from the latent DDMs and decoding back to a point cloud space. As an example, FIG. 4 illustrates data 400 or synthesized content during various stages of a synthesis process. The process can start with a set of random noise 402, such as a set of random points in latent space. As illustrated, this set of noise points can be refined over a number of denoising iterations—which may use a corresponding shape latent as a guide—to denoise the random point cloud into a set of latent points 404 that represents a relatively smooth version of a 3D object, in this example an airplane. Once the set of latent points is obtained 404, this set can be provided along with a corresponding shape latent to a trained decoder, which can generate a "reconstructed" point cloud 406, or synthesized point cloud at inference time. In at least one embodiment, such a point cloud 406 may be input to any of a number of different surface reconstruction methods—such as a Shape As Points (SAP) method—to synthesize one or more smooth multidimensional shapes, such as may correspond to a reconstructed 3D mesh 408 or other such representation. Generating a mesh or other such representation can also help to further reduce noise in the generated point cloud and thereby further increase synthesis quality.

Such an approach has an advantage of having high expressivity. By mapping point clouds into regularized latent spaces, the DDMs in latent space are effectively tasked with learning a smoothed distribution. This can be easier than training on potentially complex point clouds directly in at least some situations, which can help to improve expressivity. However, point clouds can provide a high quality representation for DDMs, such that latent points can be used, where a point cloud structure can be maintained as a primary latent representation. Augmenting such a model with an additional global shape latent variable can help to further boost expressivity.

Such an approach can also support varying output types. In at least one embodiment, LION can support Shape As Points (SAP) geometry reconstruction. Such functionality can allow for outputting of smooth surfaces. Fine-tuning SAP on data generated by a LION autoencoder can reduce synthesis noise and allow for generation of high-quality geometry. LION can combine (latent) point cloud-based modeling, which can be well suited for DDMs, with surface reconstruction. Such an approach can also be highly flexible. Since LION is set up as a VAE, it can be adapted for a variety of tasks without re-training the latent DDMs. For example, LION encoders can be fine-tuned on voxelized or noisy inputs, which a user can provide for guidance. This allows for multimodal voxel-guided synthesis and shape denoising. LION latent spaces can also be leveraged for operations such as shape interpolation and autoencoding.

Traditional DDMs perform in a discrete-step fashion. Given samples $x_0 \sim q(x_0)$ from a data distribution, DDMs can use a Markovian fixed forward diffusion process as may be given by:

$$q(x_{1:T}|x_0) := \Pi_{t=1}^T q(x_t|x_{t-1}), q(x_t|x_{t-1}) := \mathcal{N}(x_t; \sqrt{1-\beta_t}x_{t-1}, \beta_t I) \quad (1)$$

where T denotes the number of steps and $q(x_t|x_{t-1})$ is a Gaussian transition kernel, which gradually adds noise to the input with a variance schedule $\beta_1, \ldots, \beta_T$. The $\beta_T$ can be chosen such that the chain approximately converges to a standard Gaussian distribution after T steps, such as may be given by $q(x_T) \approx \mathcal{N}(0, I)$. DDMs can learn a parametrized reverse process (model parameters $\Theta$) that inverts the forward diffusion, as may be given by:

$$p_\Theta(x_{0:T}) := p(x_T) \Pi_{t=1}^T p_\Theta(x_{t-1}|x_t), p_\Theta(x_{t-1}|x_t) := \mathcal{N}(x_{t-1}; \mu_\Theta(x_t, t), \rho_t^2 I) \quad (2)$$

This generative reverse process can use Markovian with Gaussian transition kernels, which use fixed variances $\rho_t^2$. DDMs can be interpreted as latent variable models, where $x_1, \ldots, x_T$ are latents, and the forward process $q(x_{1:T}|x_0)$ acts as a fixed approximate posterior, to which the generative $p_\Theta(x_{0:T})$ is fit. DDMs can be trained by minimizing the variational upper bound on the negative log-likelihood of the data $x_0$ under $p_\Theta(x_{0:T})$. Up to irrelevant constant terms, this objective can be expressed as given by:

$$\min_\Theta \mathbb{E}_{t \sim U\{1,T\}, x_0 \sim p(x_0), \epsilon \sim \mathcal{N}(0,I)} \left[ w(t) \| \epsilon - \epsilon_\Theta(\alpha_t x_0 + \sigma_t \epsilon, t) \|_2^2 \right] \cdot w(t) = \frac{\beta_t^2}{2\rho_t^2 (1-\beta_t)(1-\alpha_t^2)}, \quad (3)$$

where $\alpha_t = \sqrt{\Pi_{s=1}^t (1-\beta_s)}$ and $\sigma_t = \sqrt{1-\alpha_t^2}$ are parameters of the tractable diffused distribution after t steps $q(x_t|x_0) = \mathcal{N}(x_t; \alpha_t x_0, \sigma_t^2 I)$. Furthermore, Equation (3) employs the widely used parametrization $$\mu_\Theta(x_t, t) := \frac{1}{\sqrt{1-\beta_t}} \left( x_t - \frac{\beta_t}{\sqrt{1-\alpha_t^2}} \epsilon_\Theta(x_t, t) \right).$$

At least one embodiment can set $w(t)=1$, instead of the one in Equation (3), which can promote perceptual quality of the generated output. In the objective of Equation (3), the model $\epsilon_\Theta$ is effectively trained to predict the noise vector that is necessary to denoise an observed diffused sample $x_t$ for all possible steps t along the diffusion process. After training, the DDM can be sampled with ancestral sampling in an iterative fashion, as may be given by:

$$x_{t-1} = \frac{1}{\sqrt{1-\beta_t}} \left( x_t - \frac{\beta_t}{\sqrt{1-\alpha_t^2}} \epsilon_\Theta(x_t, t) \right) + \rho_t \eta \quad (4)$$

where $\eta \sim \mathcal{N}(0, I)$. This sampling chain can be initialized from a random sample $x_T \sim \mathcal{N}(0, I)$. Furthermore, the noise injection in Equation 4 can be omitted in the last sampling step. DDMs can also be expressed with a continuous-time framework. In this formulation, the diffusion and reverse generative processes can be described by differential equations. Such an approach allows for deterministic sampling and encoding schemes based on ordinary differential equations (ODEs).

In at least one embodiment, point clouds $x \in \mathbb{R}^{3 \times N}$ can be modeled that consist of N points with x,y,z coordinates in $\mathbb{R}^3$. LION can be set as a hierarchical VAE with DDMs in latent space, and can use a vector-valued global shape latent $z_0 \in \mathbb{R}^{D_z}$ and a point cloud-structured latent $h_0 \in \mathbb{R}^{(3+D_h) \times N}$. Specifically, $h_0$ can be a latent point cloud consisting of N points with x,y,z coordinates in $\mathbb{R}^3$. In addition, each latent point can carry additional $D_h$ latent features. Training of LION can then performed in at least two stages. In a first stage, LION can be trained as a regular VAE with standard normal priors. In a second stage, the latent DDMs can be trained on the latent encodings.

Initially, LION can be trained by maximizing a modified variational lower bound on the data log-likelihood (ELBO) with respect to the encoder and decoder parameters $\phi$ and $\xi$, which leads to:

$$\mathcal{L}_{ELBO}(\phi, \xi) = \mathbb{E}_{p(x), q_\phi(z_0|x), q_\phi(h_0|x, z_0)} \log p_\xi(x|h_0, z_0) - \lambda_z D_{KL}(q_\phi(z_0|x) \| p(z_0)) - \lambda_h D_{KL}(q_\phi(h_0|x, z_0) \| p(h_0)) \quad (5)$$

Here, the global shape latent $z_0$ is sampled from the posterior distribution $q_\phi(z_0|x)$, which is parametrized by factorial Gaussians, whose means and variances are predicted via an encoder network. The point cloud latent $h_0$ can be sampled from a similarly parametrized posterior $q_\phi(h_0|x, z_0)$, while also conditioning on $z_0$, where $\phi$ denotes the parameters of both encoders. Furthermore, $p_\xi(x_0|h_0, z_0)$ denotes the decoder, parametrized as a factorial Laplace distribution with predicted means and fixed unit scale parameter (corresponding to an $L_1$ reconstruction loss). Here, $\lambda_z$ and $\lambda_h$ are hyperparameters balancing reconstruction accuracy and Kullback-Leibler regularization. It can be noted that only for $\lambda_z = \lambda_h = 1$ is a rigorous ELBO being optimized in this example. The priors $p(z_0)$ and $p(h_0)$ are $\mathcal{N}(0, I)$.

In at least one embodiment, the priors of a VAE could be used to sample encodings and generate new shapes. However, the basic Gaussian priors may not accurately match the encoding distribution from the training data, and may therefore produce poor samples. Another embodiment might then train highly-expressive latent DDMs. In at least one embodiment, a second stage can involve freezing the encoder and decoder networks of the VAE, and training train two latent DDMs on the encodings $z_0$ and $h_0$ sampled from $q_\phi(z_0|x)$ and $q_\phi(h_0|x, z_0)$, minimizing score matching (SM) objectives similar to Equation (2), as may be given by:

$$\mathcal{L}_{SM^z}(\theta) = \mathbb{E}_{t \sim U\{1,T\}, p(x), q_\phi(z_0|x), \epsilon \sim \mathcal{N}(0,I)} \| \epsilon - \epsilon_\theta(z_t, t) \|_2^2 \quad (6)$$

$$\mathcal{L}_{SM^h}(\psi) = \mathbb{E}_{t \sim U\{1,T\}, p(x), q_\phi(z_0|x), q_\phi(h_0|x, z_0), \epsilon \sim \mathcal{N}(0,I)} \| \epsilon - \epsilon_\psi(h_t, z_0, t) \|_2^2 \quad (7)$$

where $z_t = \alpha_t z_0 + \sigma_t \epsilon$ and $h_t = \alpha_t h_0 + \sigma_t \epsilon$ are the diffused latent encodings. Furthermore, $\theta$ denotes the parameters of the global shape latent DDM $\epsilon_\theta(z_t, t)$ and $\psi$ refers to the parameters of the conditional DDM $\epsilon_\psi(h_t, z_0, t)$ trained over the latent point cloud, noting the conditioning on $z_0$.

With latent DDMs, a generative model can be defined by $p_{\xi, \psi, \theta}(x, h_0, z_0) = p_\xi(x|h_0, z_0) p_\psi(h_0|z_0) p_\theta(z_0)$, where $p_\theta(z_0)$ denotes the distribution of the global shape latent DDM, $p_\psi(h_0|z_0)$ refers to the DDM modeling the point cloud-structured latents, and $p_{\xi, \psi, \theta}(x, h_0, z_0)$ is the decoder of LION. Such an approach can allow for sampling of the latent DDMs following Equation (4), followed by translating the latent points back to the original point cloud space with the decoder.

In at least one embodiment, the encoder networks as well as the decoder and the latent point DDM, operating on point clouds x, can be implemented based on Point-Voxel CNNs (PVCNNs). PVCNNs can efficiently combine the point-based processing of PointNets with the strong spatial inductive bias of convolutions. The DDM modeling the global shape latent can use a ResNet structure with fully-connected layers, such as may be implemented as 1×1-convolutions. Conditionings on the global shape latent can be implemented via adaptive group normalization in the PVCNN layers. Furthermore, a mixed score parametrization can be used in both latent DDMs. In such an approach, the score models are parametrized to predict a residual correction to an analytic standard Gaussian score. This can be beneficial for at least some operations, since the latent encodings can be regularized towards a standard Gaussian distribution during the first training stage.

In at least one embodiment, different variations of a given shape can be synthesized, enabling multi-modal generation in a controlled manner. For example, a point cloud x or other appropriate representation of a shape, the point cloud can be encoded into a latent space. The encodings $z_0$ and $h_0$ can be diffused for a small number of steps $\tau<T$ towards intermediate $z_\tau$ and $h_\tau$ along the diffusion process such that only local details are destroyed. Running the reverse generation process from this intermediate T, starting at $z_\tau$ and $h_\tau$, leads to variations of the original shape with different details. Such a process can be referred to as a diffuse-denoise process.

In practice, an artist using a 3D generative model may have a rough idea of a desired shape to be generated. For instance, an artist might be able to quickly construct a coarse voxelized shape, to which a generative model can then add realistic details. A LION-based approach can support such applications, such as by using a similar ELBO as in Equation (5), but with a frozen decoder. The LION encoder networks can be fine-tuned to take voxelized shapes as input, such as by placing points at the voxelized shape's surface, and map these voxelized shapes to the corresponding latent encodings $z_0$ and $h_0$ that reconstruct the original non-voxelized point cloud. A user can utilize the fine-tuned encoders to encode voxelized shapes and generate plausible detailed shapes. Such an approach can also be combined with a diffuse-denoise procedure to clean up imperfect encodings and to generate different possible detailed shapes. Such an approach can also be relatively general in nature, such that the encoder networks can be fine-tuned on noisy shapes to perform multimodal shape denoising, instead of voxel-conditioned synthesis. Such an approach can also be potentially combined with a diffuse-denoise process. In at least one embodiment, LION supports such applications easily without re-training the latent DDMs due at least in part to its VAE framework with additional encoders and decoders, in contrast to previous works that train DDMs on point clouds directly.

Such an approach can also allow for shape interpolation. In at least one embodiment, different point clouds can be encoded into a latent space and a probability flow ODE used to further encode into the latent DDMs' Gaussian priors, where spherical interpolation can be performed with valid shapes expected along the interpolation path. These intermediate encodings can be used to generate the interpolated shapes.

While point clouds may be a beneficial 3D representation for DDMs, artists may prefer meshed (or other such) outputs. In at least one embodiment, a LION-based system can be combined with one or more geometry reconstruction methods. For example, a Shape As Points (SAP)-based approach, which is based on differentiable Poisson Surface Reconstruction, can be used during training to extract smooth meshes from noisy point clouds. And SAP-based approach can be fine-tuned on training data generated by LION's autoencoder to better adapt SAP to the noise distribution in point clouds generated by LION. In one example, clean shapes can be encode into a latent space, with one or more iterations of a diffuse-denoise process being performed that only slightly modify some details of the shapes, and then decode back. A diffuse-denoise process in latent space can result in noise in the generated point clouds similar to that observed during unconditional synthesis.

A LION structure as a hierarchical VAE with latent DDMs can have various benefits. For example, such a structure can have a high level of expressivity. Training a VAE that regularizes the latent encodings to approximately fall under a standard Gaussian distribution, which is also the DDM's equilibrium distribution towards which the diffusion process converges, can result in an easier modeling task for the DDM. Such an approach only has to model the remaining mismatch between the actual encoding distribution and the Gaussian prior. This ultimately translates into improved expressivity, which can be further enhanced by the additional decoder network. However, point clouds can be a beneficial representation for the DDM framework, because they can be diffused and denoised without significant effort, and powerful point cloud processing architectures exist. In at least one embodiment, a LION-based approach can use point cloud latents that combine the advantages of both latent DDMs and 3D point clouds. Point cloud latents can be interpreted as a smoothed version of the original point cloud that can be easier to model. Moreover, a VAE setup with additional global shape latent according to at least one embodiment can increase LION's expressivity even further, and can result in natural disentanglement between overall shape and local details captured by the shape latents and latent points.

Another advantage of a LION VAE framework is that its encoders can be fine-tuned for various relevant tasks, as discussed previously. Such a framework also allows or shape interpolation. Other 3D point cloud DDMs operating on point clouds directly do not offer simultaneously as much flexibility and expressivity out-of-the-box. Since artists may prefer meshed model outputs, LION can be used with surface reconstruction techniques, again combining the best of both worlds—a point cloud-based VAE back-bone for DDMs and smooth geometry reconstruction methods operating on the synthesized point clouds to generate practically useful smooth surfaces, which can be transformed into high quality meshes.

Figure 5:
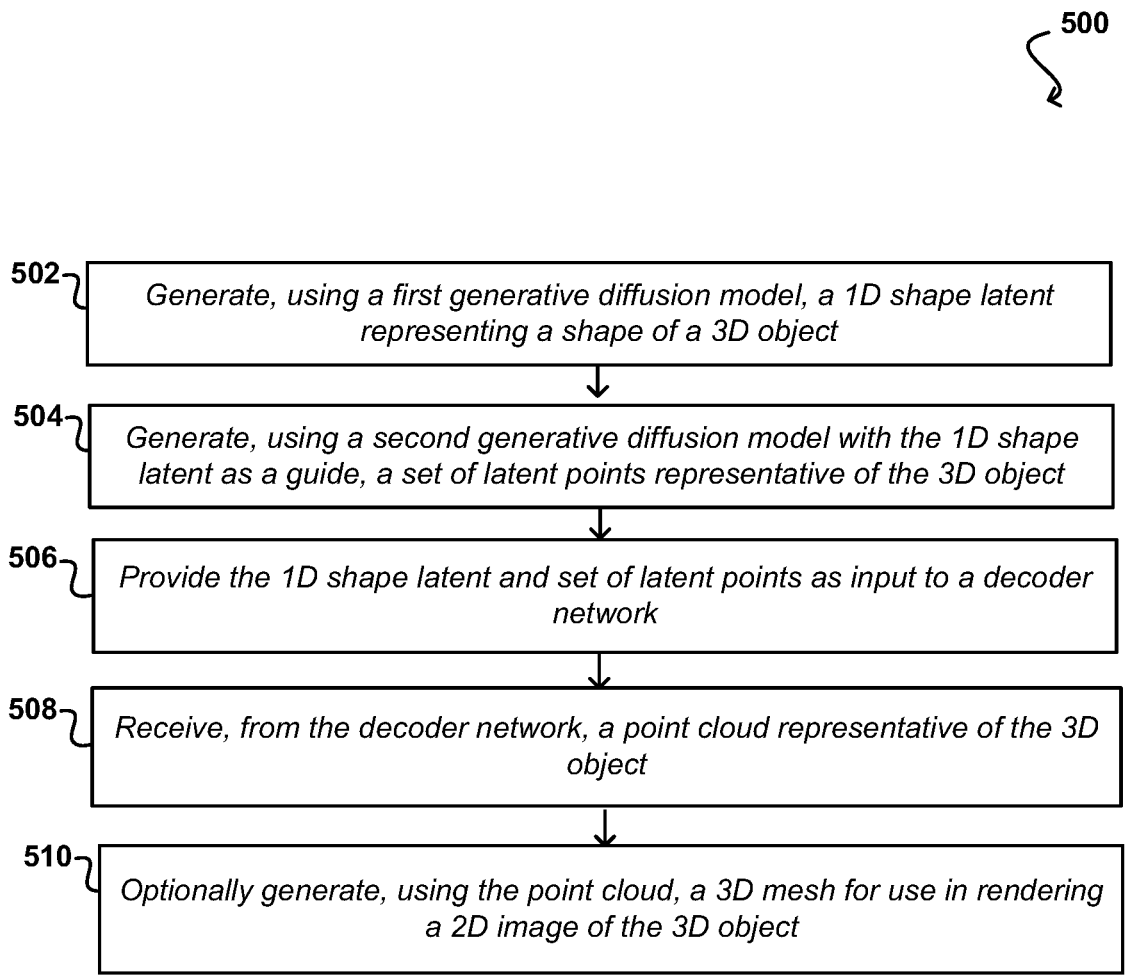
FIG. 5 illustrates an example process for generating a shape representation for a three-dimensional object using a pair of diffusion models, according to at least one embodiment.

FIG. 5 illustrates an example process 500 for performing unconditional, general shape generation according to at least one embodiment. It should be understood that for this and other processes presented herein that there may be additional, fewer, or alternative steps performed or similar or alternative orders, or at least partially in parallel, within the scope of the various embodiments unless otherwise specifically stated. Further, although this example is described with respect to generating an image, it should be understood that other types of output can be generated as well within the scope of various embodiments. In this example process, a 1D shape latent is generated 502 using a first generative diffusion model, such as a first trained DDM, where that shape latent represents a shape of a random 3D object. This can effectively draw a sample from the first diffusion model that models global encodings. The shape latent can have been generated at random using Gaussian noise input to the first generative diffusion model in at least one embodiment.

A set of latent points, representative of the same 3D object, is generated 504 using a second generative diffusion model, such as a second trained DDM, where the second generative diffusion model takes as input the 1D shape latent to guide the set determination process. Such an approach effectively draws a sample from the second diffusion model, given the global encoding sample from the first diffusion model, where the sample models the point-structured local encodings. The 1D shape latent and the set of latent point encodings are provided 506 as input to a decoder network, such as a decoder of a variational autoencoder architecture or other generative model. A three-dimensional point cloud can be received 508 as output from the decoder, where the point cloud is representative of—or describes at least the surface of—the 3D object. Where appropriate, this synthesized point cloud can be used to generate other types of representations of the 3D object. For example, the point cloud can optionally be used to generate 510 a 3D mesh representation, such as may be useful in rendering one or more 2D images of the 3D object from one or more viewpoints, among other such options.

Such a process can also allow for high-resolution shape generation based on a coarse voxel input, such as may be created by a digital artist with relatively minimal effort. This coarse voxel input can help guide the synthesis process to generate a type of object similar in shape to the coarse voxel input, which can help to guide the type of object that is output by this general synthesis process. Instead of directly synthesizing random new 3D shapes, additional auxiliary encoder neural networks can be trained that map voxelized input data to those encodings in latent space that best correspond to the original non-voxelized shapes. This can be used by a user such as an artist, who can quickly put together an approximate shape from coarse voxels. This coarse voxel shape can be mapped into latent space. The diffusion model can be used to inject noise into the encoding and denoise again to generate various different, but similar, encodings. Using the decoder, these encodings can be decoded back to the original point clouds. This can generate diverse, detailed, non-voxel shapes, which still correspond to the original voxelized input in terms of overall shape.

Such a process can also support text-conditioned shape generation, where a text input can be provided as input to the model, or at least an encoding of the text input in a latent space. Leveraging models such as CLIP, which have image- and text-encoders that map images and text prompts into a joint CLIP latent space, text-conditioned diffusion models can be trained in a relevant latent space. In at least one embodiment, diffusion models can be trained conditioned on the CLIP encodings obtained by rendered images of the underlying 3D training data. For generation at inference time, the CLIP encodings obtained from a text encoder can be used to condition the latent diffusion models on text prompts.

Such a process can allow for shape denoising, where a noisy shape—such as a noisy point cloud that describes the shape—is provided as input. This noisy point cloud can be used as a starting point for denoising rather than a random set of points, which can help guide the type of object for which a set of latent points is to be produced. Instead of training a new encoder for voxelized inputs, for example, an encoder can be trained for noisy input shapes. Following an approach similar to that described for voxelized inputs, such an approach allows for generation of diverse, detailed, non-noisy shapes.

Such a process can also allow for shape editing and interpolation, where a given or generated shape can edited by providing that shape (or a latent representation of that shape) as input to such a process. In at least one embodiment, 3D shape editing can be performed by manipulating the latent encodings and decoding to the corresponding shapes. In one example, the latent space can be randomly traversed, which can lead to smooth interpolations between different random shapes. Given shapes can also be encoded shapes into a latent space, then edited by interpolating the encodings towards other reference encodings of other shapes. These interpolations can be performed in the prior distribution of the latent space diffusion models themselves, which leads to high quality synthesis.

Synthesis approaches in accordance with at least one embodiment have various advantages over other synthesis systems. For example, the use of additional encoders (and the decoder) with latent variables can help to improve overall synthesis performance, allowing for operations such as denoising and voxel-conditioning synthesis. Additional specialized encoder networks can be trained for voxelized or noisy inputs, without a need to train new latent space diffusion models for these tasks. Approaches presented herein do not rely on adversarial training methods to build 3D generative models, which can be beneficial since adversarial training directly on three-dimensional training data can be unstable, not easily scalable, and can lack diversity in the generation results. Approaches presented herein can also leverage additional surface reconstruction methods to extract useful meshes, whereas prior methods for 3D generation that leverage point cloud-based representations usually only synthesize the point cloud representing the surface. Approaches can also allow for the addition of synthesized texture to an object mesh generated using such a process.

Other approaches can be used as well in accordance with other embodiments. For example, accelerated sampling from DDMs can be performed by adjusting the timesteps used in time-discretized DDMs, such as through grid search or dynamic programming. Modern ODE and SDE solvers can also be used to provide for fast synthesis from (continuous-time) DDMs. In one example, a DDIM ODE can be simulated using a higher-order linear multistep method. Alternatively, sampling from DDMs can also be accelerated via learning. For example, parameters of a generalized family of DDMs can be learned by optimizing for perceptual output quality, or a DDIM sampler can be distilled into a student model, which enables sampling in as few as a single step. In one example, the Gaussian samplers of a DDM can be replaced with expressive generative adversarial networks, similarly allowing for few-step synthesis. Other approaches to accelerate DDM sampling may change the diffusion itself, among other such options.

Figure 6:
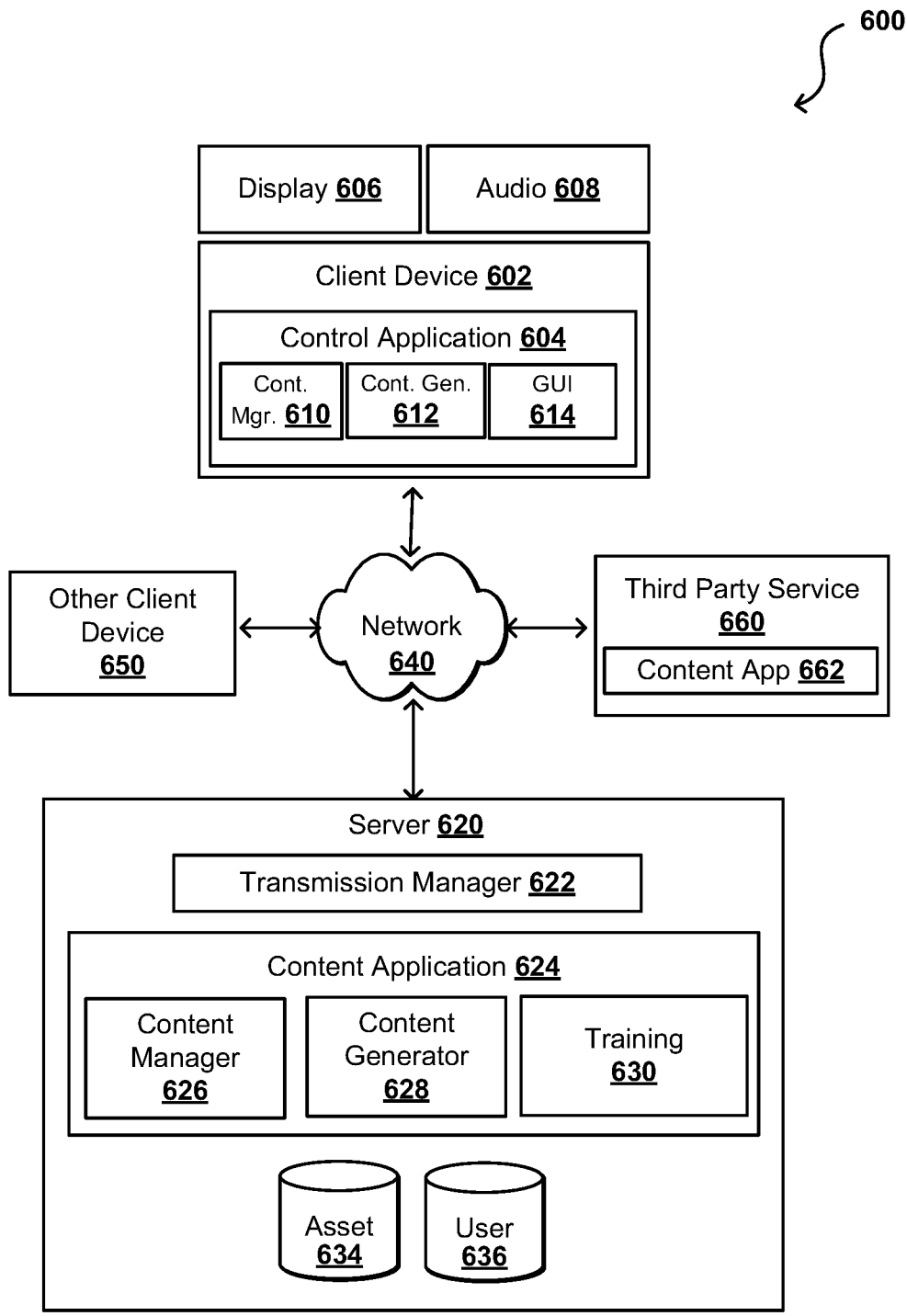
FIG. 6 illustrates components of a distributed system that can be used to perform content synthesis, according to at least one embodiment.

As an example, FIG. 6 illustrates an example networked system configuration 600 that can be used to provide, generate, modify, encode, process, and/or transmit image data or other such content. In at least one embodiment, a client device 602 can generate or receive data for a session using components of a control application 604 on a client device 602 and data stored locally on that client device. In at least one embodiment, a content application 624 executing on a server 620—such as a cloud server or edge server—may initiate a session associated with at least that client device 602, as may use a session manager and user data stored in a user database 636, and can cause content such as one or more object representations—such as one or more three-dimensional point clouds or geometric meshes—from an object repository 634 to be selected by a content manager 626 for processing. A content manager 626 may additionally, or alternatively, work with a content generator 628 to generate novel image content, such as these points clouds or meshes, or images of objects corresponding to these meshes. The point clouds or meshes can be generated for objects of one or more object classes for which one or more models or networks of the content generator were trained, using a training module 630. In at least one embodiment, this content generator 628 can receive random noise as input and use a pair of denoising diffusion networks to generate a 3D point cloud representation of an object using a denoising process. At least a portion of the generated content—which may correspond to a synthesized image or data (e.g., a point cloud or mesh) useful in generating such an image—may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding control application 604, which may also or alternatively include a graphical user interface ("GUI") 614, content manager 610, and content generator 612 for use in selecting, providing, synthesizing, rendering, modifying, or using content for presentation (or other purposes) on or by the client device 602. A decoder may also be used to decode data received over the network 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 636, to client device 602. In at least one embodiment, at least a portion of this content can be obtained, enhanced, and/or streamed from another source, such as a third party service 660 or other client device 650, that may also include a content application 662 for generating, enhancing, or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network ("LAN"), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more VMs. In at least one embodiment, such a system can be implemented at least partially in a data center or at least partially using cloud computing resources.

Inference and Training Logic

Figure 7A:
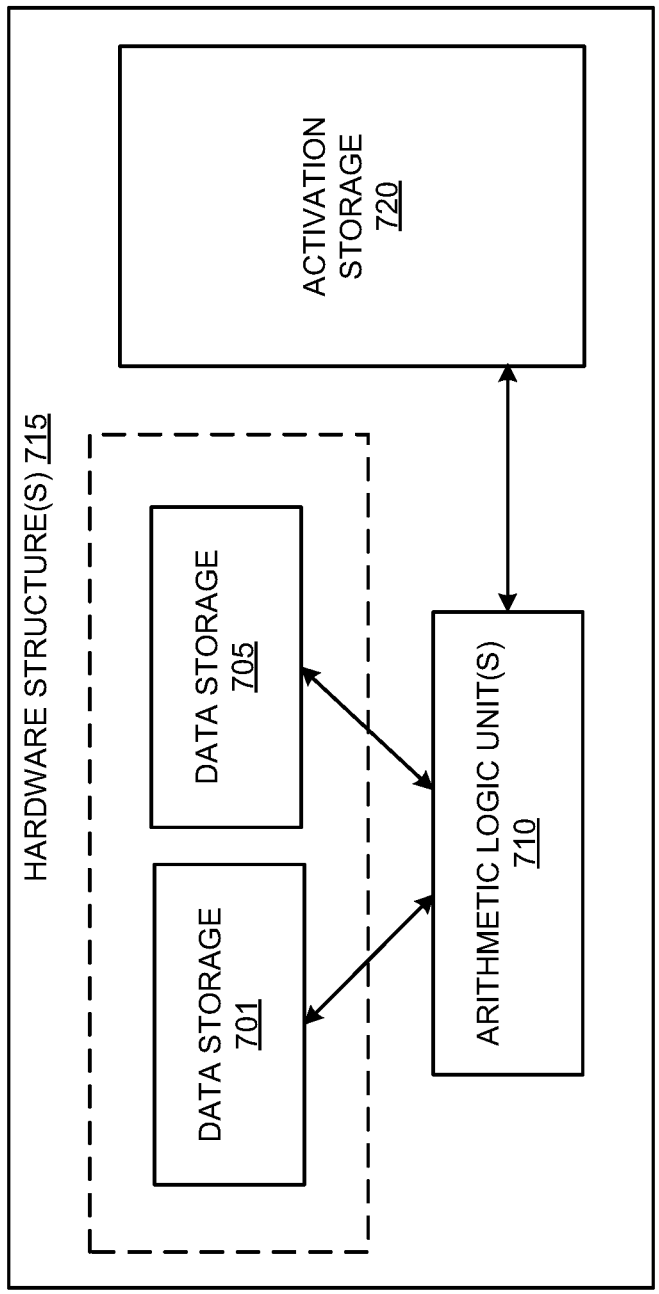
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic unit(s) ("ALU(s)"). In at least one embodiment, code, such as graph code, loads weight or other parameter information into processor ALU(s) based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or data storage 701 may be cache memory, dynamic randomly addressable memory ("DRAM"), static randomly addressable memory ("SRAM"), non-volatile memory (for example, Flash memory), or other storage. In at least one embodiment, choice of whether code and/or data storage 701 is internal or external to a processor, for example, or comprised of DRAM, SRAM, Flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, ALU(s). In at least one embodiment, code, such as graph code, loads weight or other parameter information into processor ALU(s) based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (for example, Flash memory), or other storage. In at least one embodiment, choice of whether code and/or data storage 705 is internal or external to a processor, for example, or comprised of DRAM, SRAM, Flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (for example, graph code), a result of which may produce activations (for example, output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 701 and/or code and/or data storage 705 are used as operands along with other values, such as bias values, gradient information, momentum values, or other parameters or hyperparameters, any or all of which may be stored in code and/or data storage 701 or code and/or data storage 705 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (for example, a co-processor). In at least one embodiment, ALU(s) 710 may be included within a processor's execution units or otherwise within a bank of ALU(s) accessible by a processor's execution units either within same processor or distributed between different processors of different types (for example, CPUs, GPUs, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (for example, Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash memory or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit ("IPU") from Graphcore™, or a Nervana® (for example, "Lake Crest") processor from Intel Corp. In at least one embodiment, inference and/or training logic 715 illustrated in FIG. 7A may be used in conjunction with CPU hardware, GPU hardware or other hardware, such as field programmable gate arrays ("FPGAs").

Figure 7B:
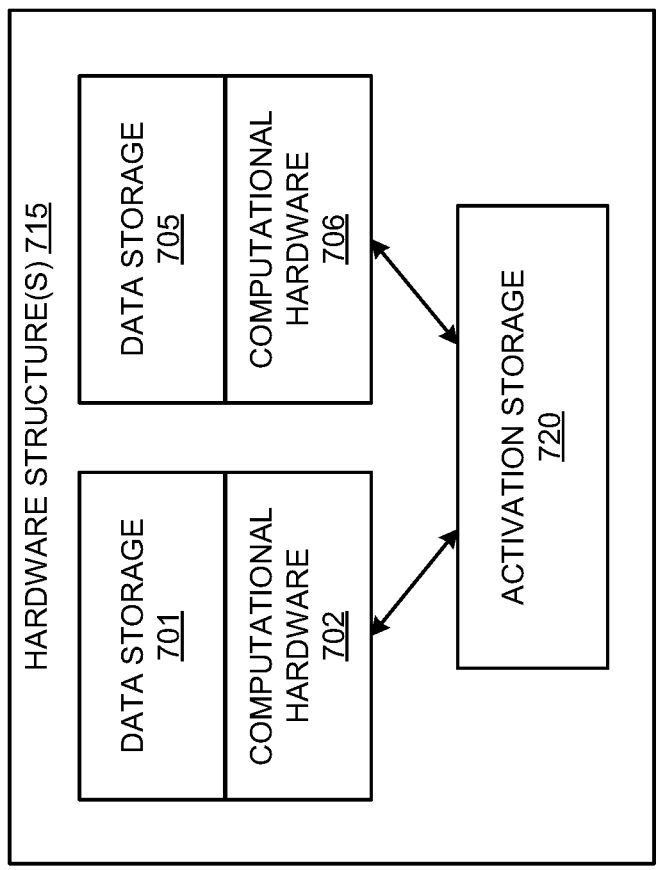
FIG. 7B illustrates inference and/or training logic, according to at least one embodiment.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an ASIC, such as Tensorflow® Processing Unit from Google, an IPU from Graphcore™, or a Nervana® (for example, "Lake Crest") processor from Intel Corp. In at least one embodiment, inference and/or training logic 715 illustrated in FIG. 7B may be used in conjunction with CPU hardware, GPU hardware or other hardware, such as FPGAs. In at least one embodiment, inference and/or training logic 715 includes, without limitation, code and/or data storage 701 and code and/or data storage 705, which may be used to store code (for example, graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALU(s) that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
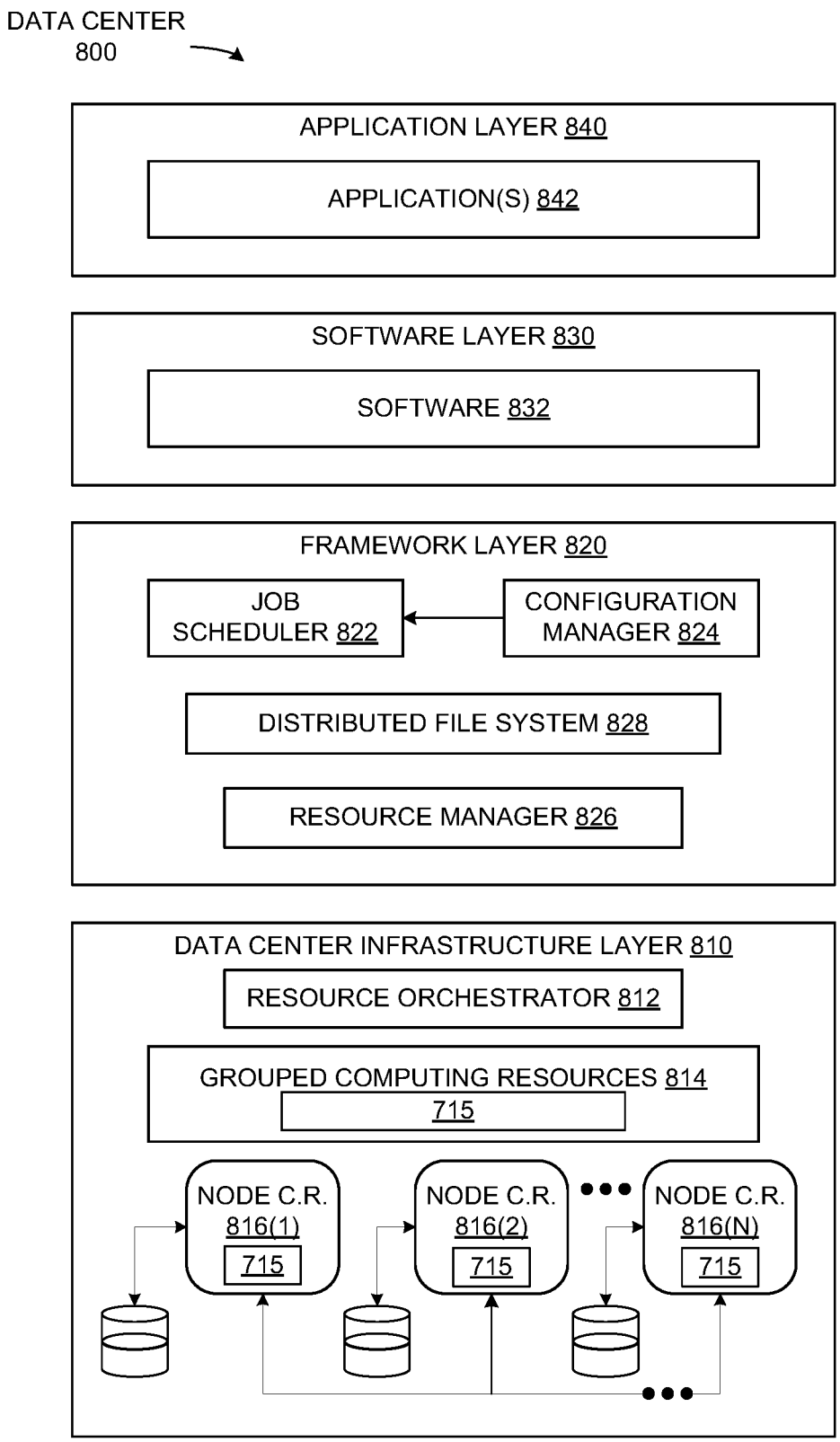
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of CPUs or other processors (including accelerators, FPGAs, graphics processors, etc.), memory devices (for example, dynamic read-only memory, storage devices (for example, solid state or disk drives), network input/output ("NW I/O") devices, network switches, VMs, power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator 812 may include hardware, software or some combination thereof.

In at least one embodiment, as shown in FIG. 8, framework layer 820 includes a job scheduler 822, a configuration manager 824, a resource manager 826, and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud, and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (for example, "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (for example, PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, ASICs, GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence ("AI") services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to synthesize novel object representations, such as 3D point clouds or meshes, using a pair of denoising diffusion models.

Computer Systems

Figure 9:
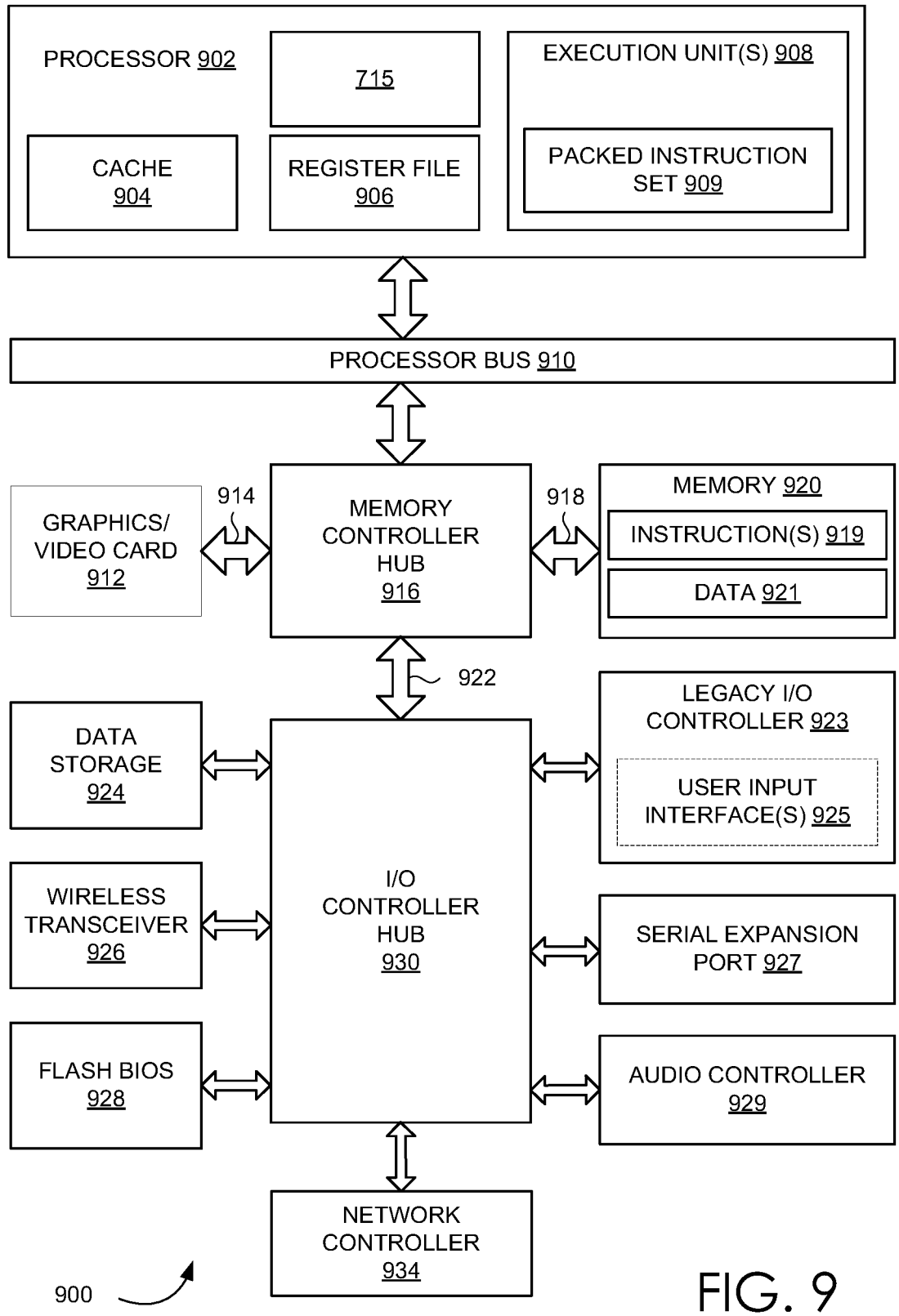
FIG. 9 illustrates a computer system, according to at least one embodiment.

FIG. 9 is a block diagram illustrating an exemplary computer system, which may be a system with interconnected devices and components, a system-on-a-chip ("SOC") or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), SOC, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution unit(s) 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computing ("CISC") microprocessor, a reduced instruction set computing ("RISC") microprocessor, a very long instruction word computing ("VLIW") microprocessor, a processor implementing a combination of instruction sets, or any other processor device, such as a DSP, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache 904 may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit(s) 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit(s) 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor data bus 910 for performing operations on packed data, which may eliminate need to transfer smaller units of data across processor data bus 910 to perform one or more operations one data element at a time.

In at least one embodiment, execution unit(s) 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a DRAM device, a SRAM device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and user input interface(s) 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary SOC. In at least one embodiment, devices may be interconnected with proprietary interconnects, standardized interconnects (for example, PCIe) or some combination thereof. In at least one embodiment, one or more components of computer system 900 are interconnected using compute express link ("CXL") interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to synthesize novel object representations, such as 3D point clouds or meshes, using a pair of denoising diffusion models.

Figure 10:
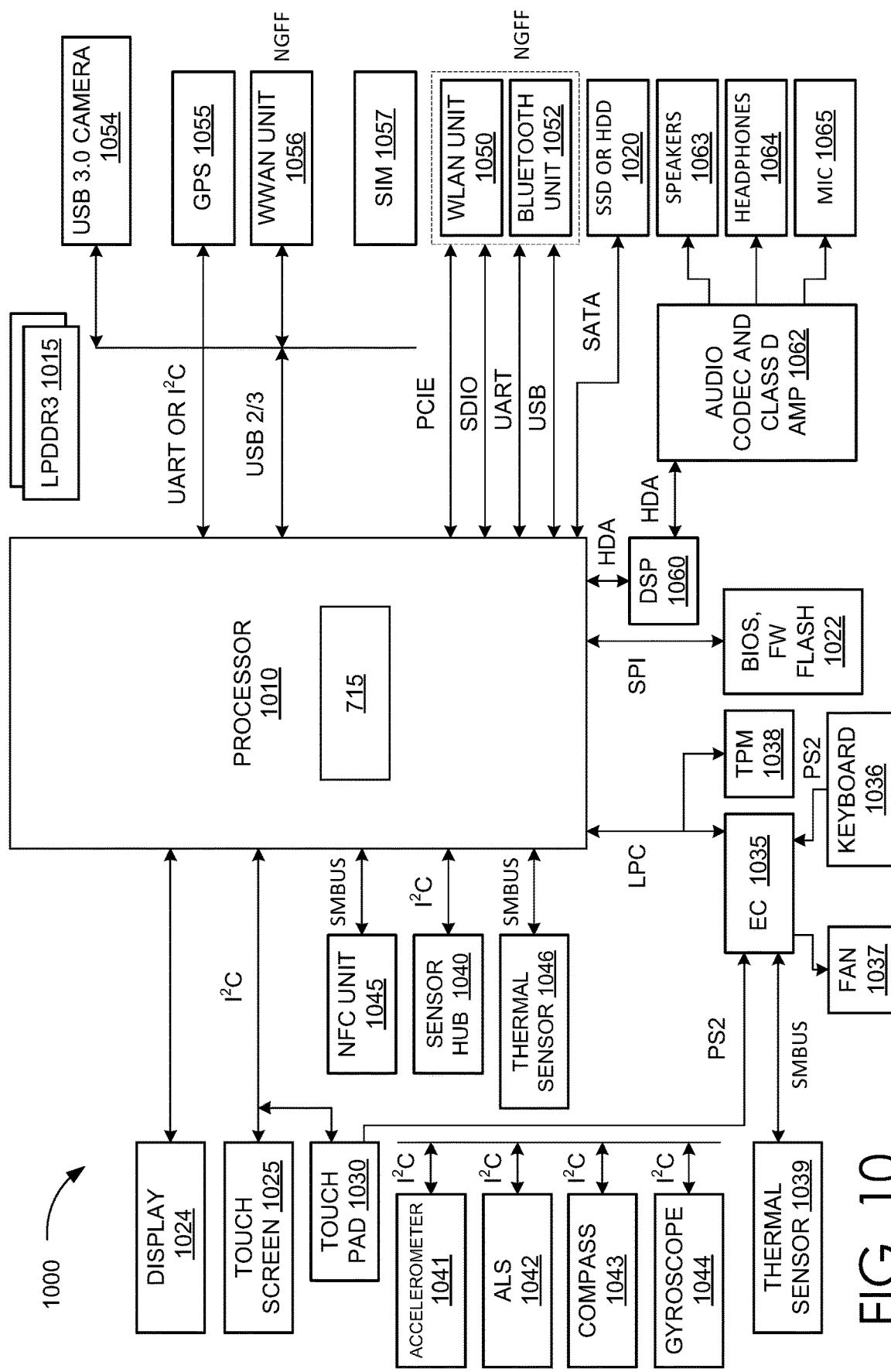
FIG. 10 illustrates a computer system, according to at least one embodiment.

FIG. 10 is a block diagram illustrating an electronic device 1000 for using a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, an USB (versions 1, 2, 3), or an Universal Asynchronous Receiver/Transmitter ("UART") bus. In at least one embodiment, FIG. 10 illustrates an electronic device 1000, which includes interconnected hardware devices or "chips", whereas in other embodiments, FIG. 10 may illustrate an exemplary SOC. In at least one embodiment, devices illustrated in FIG. 10 may be interconnected with proprietary interconnects, standardized interconnects (for example, PCIe) or some combination thereof. In at least one embodiment, one or more components of FIG. 10 are interconnected using CXL interconnects.

In at least one embodiment, FIG. 10 may include a display 1024, a touch screen 1025, a touch pad 1030, a Near Field Communications ("NFC") unit 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network ("WLAN") unit 1050, a Bluetooth unit 1052, a Wireless Wide Area Network ("WWAN") unit 1056, a Global Positioning System ("GPS") 1055, a camera ("USB 3.0 camera") 1054 such as an USB 3.0 camera, and/or a Low Power Double Data Rate ("LPDDR") memory unit ("LPDDR3") 1015 implemented in, for example, LPDDR 3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1036, and a touch pad 1030 may be communicatively coupled to EC 1035. In at least one embodiment, speakers 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1062 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to synthesize novel object representations, such as 3D point clouds or meshes, using a pair of denoising diffusion models.

Figure 11:
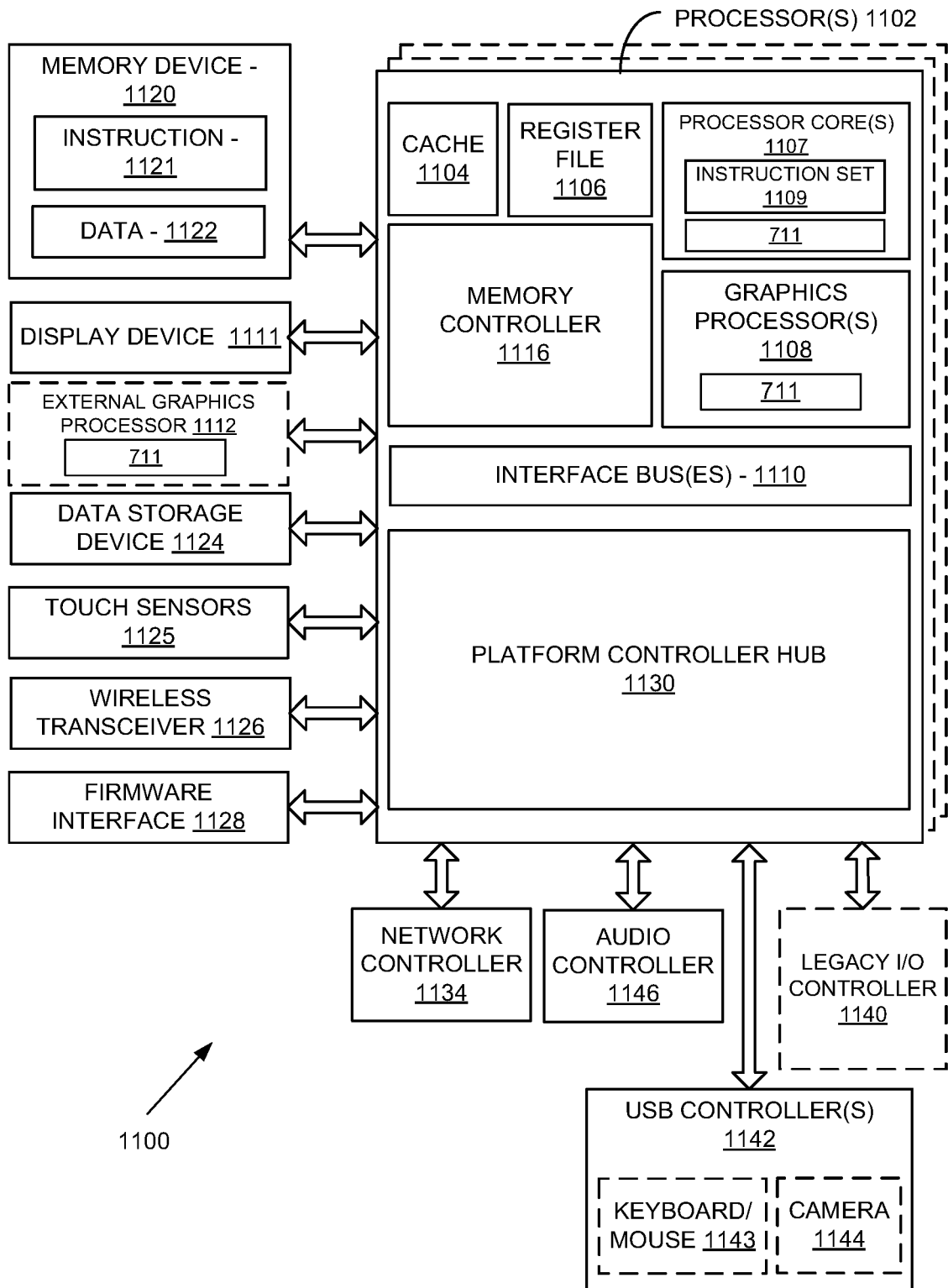
FIG. 11 illustrates at least portions of a graphics processor, according to one or more embodiments.

FIG. 11 is a block diagram of a processing system, according to at least one embodiment. In at least one embodiment, system 1100 includes one or more processor(s) 1102 and one or more graphics processor(s) 1108, and may be a single processor desktop system, a multiprocessor workstation system, or a server system having a large number of processor(s) 1102 or processor core(s) 1107. In at least one embodiment, system 1100 is a processing platform incorporated within a SoC integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, coupled with, or be integrated within a wearable device, such as a smart watch wearable device, smart eyewear device, AR device, or VR device. In at least one embodiment, processing system 1100 is a television or set top box device having one or more processor(s) 1102 and a graphical interface generated by one or more graphics processor(s) 1108.

In at least one embodiment, one or more processor(s) 1102 each include one or more processor core(s) 1107 to process instructions which, when executed, perform operations for system and user software. In at least one embodiment, each of one or more processor core(s) 1107 is configured to process a specific instruction set 1109. In at least one embodiment, instruction set 1109 may facilitate CISC, RISC, or computing via a VLIW. In at least one embodiment, processor core(s) 1107 may each process a different instruction set 1109, which may include instructions to facilitate emulation of other instruction sets. In at least one embodiment, processor core(s) 1107 may also include other processing devices, such a DSP.

In at least one embodiment, processor(s) 1102 includes cache memory ("cache") 1104. In at least one embodiment, processor(s) 1102 can have a single internal cache or multiple levels of internal cache. In at least one embodiment, cache memory is shared among various components of processor(s) 1102. In at least one embodiment, processor(s) 1102 also uses an external cache (for example, a Level-3 ("L3") cache or Last Level Cache ("LLC")) (not shown), which may be shared among processor core(s) 1107 using known cache coherency techniques. In at least one embodiment, register file 1106 is additionally included in processor(s) 1102 which may include different types of registers for storing different types of data (for example, integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor(s) 1102 and other components in system 1100. In at least one embodiment, interface bus(es) 1110, in one embodiment, can be a processor bus, such as a version of a Direct Media Interface ("DMI") bus. In at least one embodiment, interface bus(es) 1110 is not limited to a DMI bus, and may include one or more Peripheral Component Interconnect buses (for example, PCI, PCI Express), memory buses, or other types of interface buses. In at least one embodiment processor(s) 1102 include an integrated memory controller 1116 and a platform controller hub ("PCH") 1130. In at least one embodiment, memory controller 1116 facilitates communication between a memory device 1120 and other components of system 1100, while PCH 1130 provides connections to I/O devices via a local I/O bus.

In at least one embodiment, memory device 1120 can be a DRAM device, a SRAM device, a flash memory device, a phase-change memory device, or some other memory device having suitable performance to serve as process memory. In at least one embodiment memory device 1120 can operate as system memory for system 1100, to store data 1122 and instruction 1121 for use when one or more processor(s) 1102 executes an application or process. In at least one embodiment, memory controller 1116 also couples with an optional external graphics processor 1112, which may communicate with one or more graphics processor(s) 1108 in processor(s) 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (for example, DisplayPort, etc.). In at least one embodiment, display device 1111 can include a head mounted display ("HMD") such as a stereoscopic display device for use in VR applications or AR applications.

In at least one embodiment, PCH 1130 allows peripherals to connect to memory device 1120 and processor(s) 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (for example, a hard disk drive, a flash memory, etc.). In at least one embodiment, data storage device 1124 can connect via a storage interface (for example, SATA) or via a peripheral bus, such as a Peripheral Component Interconnect bus (for example, PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution ("LTE") transceiver. In at least one embodiment, firmware interface 1128 allows communication with system firmware, and can be, for example, a unified extensible firmware interface ("UEFI"). In at least one embodiment, network controller 1134 can allow a network connection to a wired network. In at least one embodiment, a high-performance network controller (not shown) couples with interface bus(es) 1110. In at least one embodiment, audio controller 1146 is a multi-channel high definition audio controller. In at least one embodiment, system 1100 includes an optional legacy I/O controller 1140 for coupling legacy (for example, Personal System 2 ("PS/2")) devices to system. In at least one embodiment, PCH 1130 can also connect to one or more USB controller(s) 1142 connect input devices, such as keyboard and mouse 1143 combinations, a camera 1144, or other USB input devices.

In at least one embodiment, an instance of memory controller 1116 and PCH 1130 may be integrated into a discreet external graphics processor, such as external graphics processor 1112. In at least one embodiment, PCH 1130 and/or memory controller 1116 may be external to one or more processor(s) 1102. For example, in at least one embodiment, system 1100 can include an external memory controller 1116 and PCH 1130, which may be configured as a MCH and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALU(s) embodied in a graphics processor. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALU(s) of a graphics processor to perform one or more machine learning algorithms, neural network architectures, use cases, or training techniques described herein.

Such components can be used to synthesize novel object representations, such as 3D point clouds or meshes, using a pair of denoising diffusion models.

Figure 12:
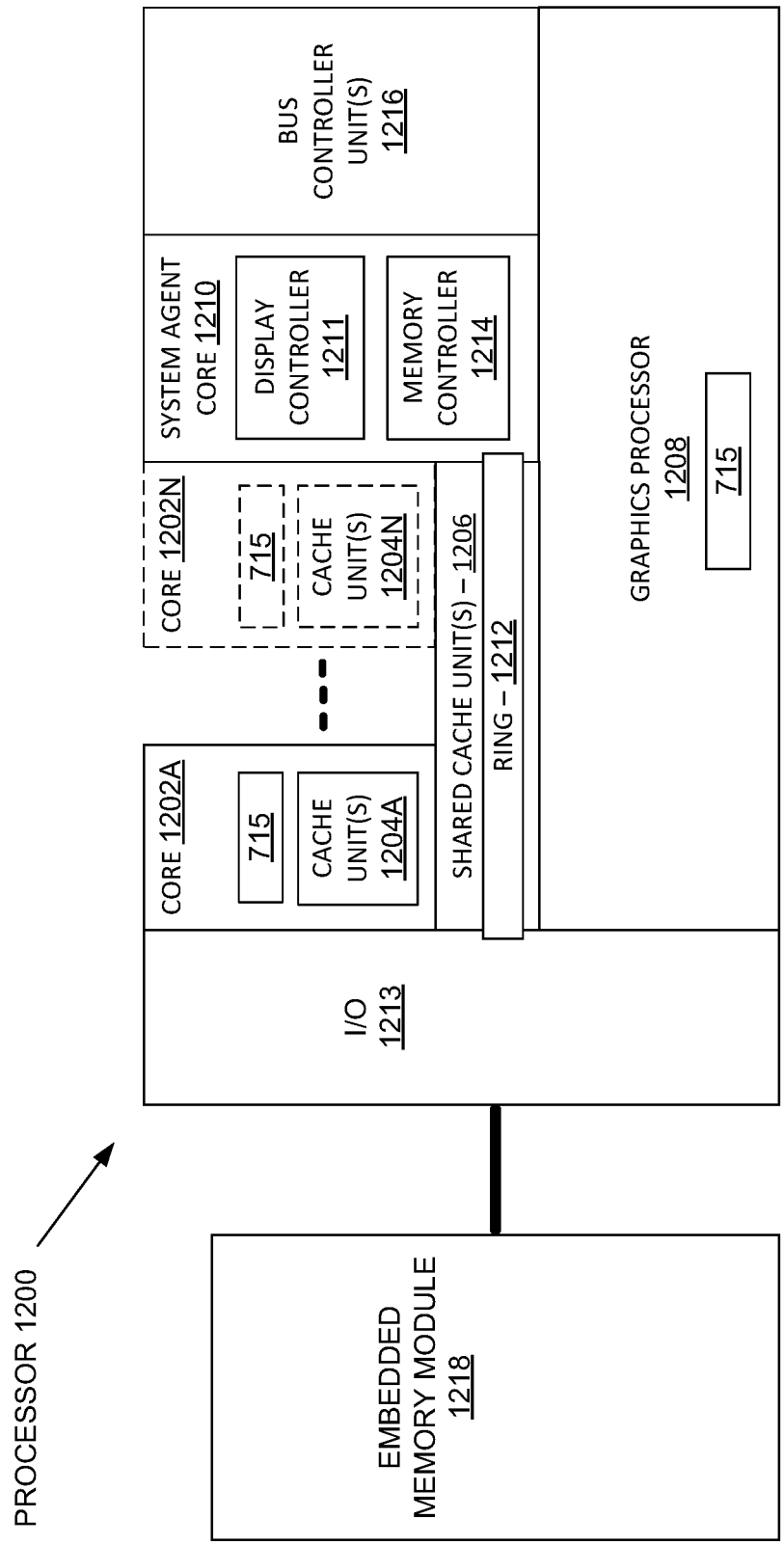
FIG. 12 illustrates at least portions of a graphics processor, according to one or more embodiments.

FIG. 12 is a block diagram of a processor 1200 having one or more processor core(s) 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor core(s) 1202A-1202N includes one or more internal cache unit(s) 1204A-1204N. In at least one embodiment, each processor core also has access to one or more shared cached unit(s) 1206.

In at least one embodiment, internal cache unit(s) 1204A-1204N and shared cache unit(s) 1206 represent a cache memory hierarchy within processor 1200. In at least one embodiment, cache memory unit(s) 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache unit(s) 1206 and 1204A-1204N.

In at least one embodiment, processor 1200 may also include a set of one or more bus controller unit(s) 1216 and a system agent core 1210. In at least one embodiment, one or more bus controller unit(s) 1216 manage a set of peripheral buses, such as one or more PCI or PCI express buses. In at least one embodiment, system agent core 1210 provides management functionality for various processor components. In at least one embodiment, system agent core 1210 includes one or more integrated memory controller(s) 1214 to manage access to various external memory devices (not shown).

In at least one embodiment, one or more of processor core(s) 1202A-1202N include support for simultaneous multi-threading. In at least one embodiment, system agent core 1210 includes components for coordinating and processor core(s) 1202A-1202N during multi-threaded processing. In at least one embodiment, system agent core 1210 may additionally include a power control unit ("PCU"), which includes logic and components to regulate one or more power states of processor core(s) 1202A-1202N and graphics processor 1208.

In at least one embodiment, processor 1200 additionally includes graphics processor 1208 to execute graphics processing operations. In at least one embodiment, graphics processor 1208 couples with shared cache unit(s) 1206, and system agent core 1210, including one or more integrated memory controller(s) 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring based interconnect unit 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor core(s) 1202A-1202N and graphics processor 1208 use embedded memory module 1218 as a shared Last Level Cache.

In at least one embodiment, processor core(s) 1202A-1202N are homogenous cores executing a common instruction set architecture. In at least one embodiment, processor core(s) 1202A-1202N are heterogeneous in terms of instruction set architecture ("ISA"), where one or more of processor core(s) 1202A-1202N execute a common instruction set, while one or more other cores of processor core(s) 1202A-1202N executes a subset of a common instruction set or a different instruction set. In at least one embodiment, processor core(s) 1202A-1202N are heterogeneous in terms of microarchitecture, where one or more cores having a relatively higher power consumption couple with one or more power cores having a lower power consumption. In at least one embodiment, processor 1200 can be implemented on one or more chips or as a SOC integrated circuit.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processor 1200. For example, in at least one embodiment, training and/or inferencing techniques described herein may use one or more of ALU(s) embodied in graphics processor 1208, graphics core(s) 1202A-1202N, or other components in FIG. 12. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALU(s) of graphics processor 1200 to perform one or more machine learning algorithms, neural network architectures, use cases, or training techniques described herein.

Such components can be used to synthesize novel object representations, such as 3D point clouds or meshes, using a pair of denoising diffusion models.

Virtualized Computing Platform

Figure 13:
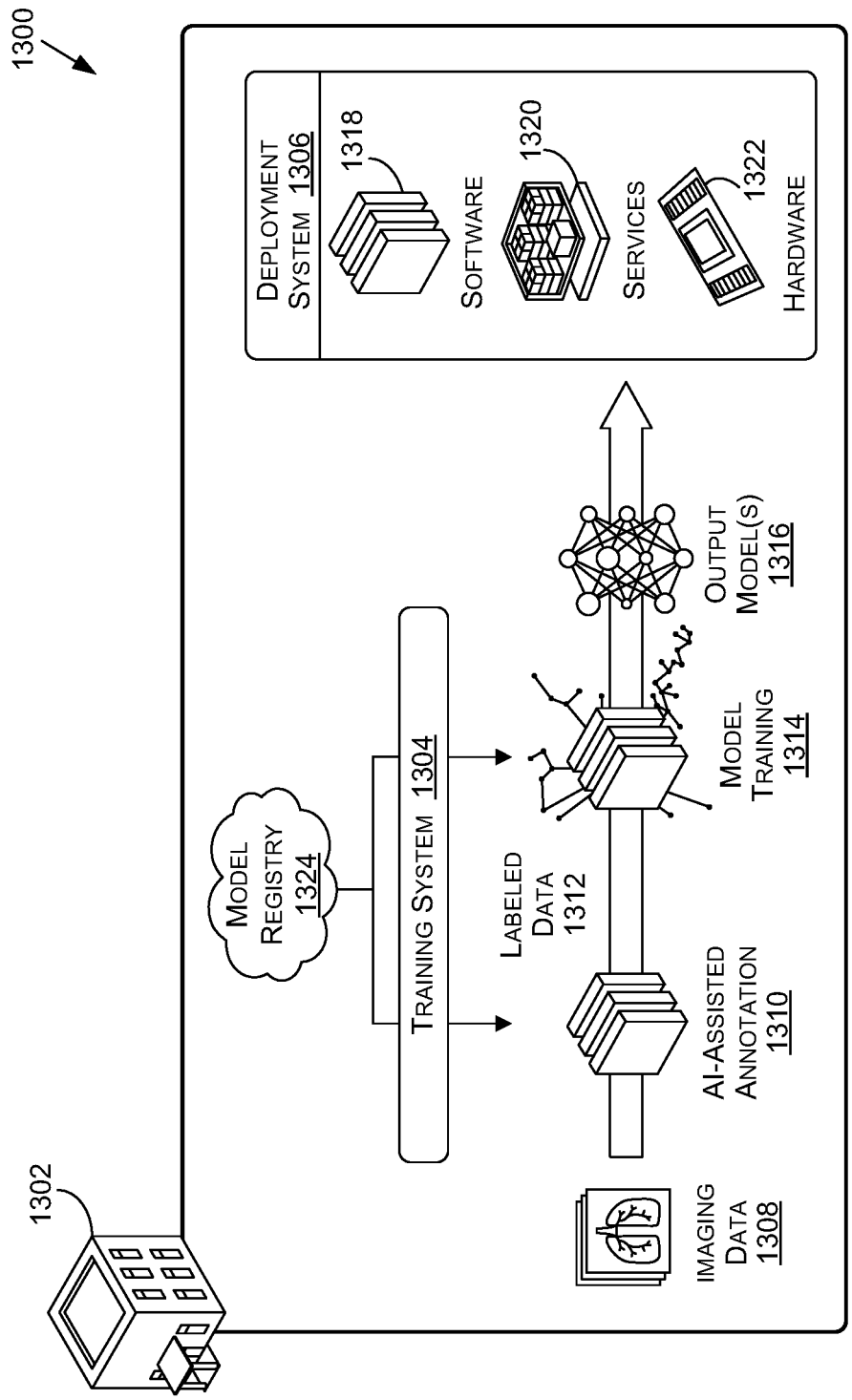
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facility(ies) 1302. Process 1300 may be executed within a training system 1304 and/or a deployment system 1306. In at least one embodiment, training system 1304 may be used to perform training, deployment, and implementation of machine learning models (for example, neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility(ies) 1302. In at least one embodiment, one or more applications in a pipeline may use or call upon services (for example, inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility(ies) 1302 using data 1308 (such as imaging data) generated at facility(ies) 1302 (and stored on one or more picture archiving and communication system ("PACS") servers at facility(ies) 1302), may be trained using imaging or sequencing data 1308 from another facility(ies) 1302, or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage compatible application programming interface ("API") from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1304 (FIG. 13) may include a scenario where facility(ies) 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (for example, convolutional neural networks ("CNNs")) that may be trained to generate annotations corresponding to certain types of imaging data 1308 (for example, from certain devices). In at least one embodiment, AI-assisted annotation 1310 may then be used directly, or may be adjusted or fine-tuned using an annotation tool to generate ground truth data. In at least one embodiment, AI-assisted annotation 1310, labeled data 1312, or a combination thereof may be used as ground truth data for training a machine learning model. In at least one embodiment, a trained machine learning model may be referred to as output model(s) 1316, and may be used by deployment system 1306, as described herein.

In at least one embodiment, a training pipeline may include a scenario where facility(ies) 1302 needs a machine learning model for use in performing one or more processing tasks for one or more applications in deployment system 1306, but facility(ies) 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility(ies) 1302 (for example, facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model(s) 1316—and may be used in deployment system 1306 to perform one or more processing tasks for one or more applications of a deployment system.

In at least one embodiment, a scenario may include facility(ies) 1302 requiring a machine learning model for use in performing one or more processing tasks for one or more applications in deployment system 1306, but facility(ies) 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility(ies) 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314 (for example, AI-assisted annotation 1310, labeled clinic data 1312, or a combination thereof) may be used as ground truth data for retraining or updating a machine learning model. In at least one embodiment, a trained machine learning model may be referred to as output model(s) 1316, and may be used by deployment system 1306, as described herein.

In at least one embodiment, deployment system 1306 may include software 1318, services 1320, hardware 1322, and/ or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (for example, inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility(ies) 1302 after processing through a pipeline (for example, to convert outputs back to a usable data type). In at least one embodiment, a combination of containers within software 1318 (for example, that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (for example, imaging data 1308) in a specific format in response to an inference request (for example, a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (for example, as a response to an inference request). In at least one embodiment, inferencing tasks may be performed by one or more machine learning models, such as trained or deployed neural networks, which may include output model(s) 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (for example, limited access) area of a container registry (described in more detail herein), and trained or deployed models may be stored in model registry 1324 and associated with one or more applications. In at least one embodiment, images of applications (for example, container images) may be available in a container registry, and once selected by a user from a container registry for deployment in a pipeline, an image may be used to generate a container for an instantiation of an application for use by a user's system.

In at least one embodiment, developers (for example, software developers, clinicians, doctors, etc.) may develop, publish, and store applications (for example, as containers) for performing image processing and/or inferencing on supplied data. In at least one embodiment, development, publishing, and/or storing may be performed using a software development kit ("SDK") associated with a system (for example, to ensure that an application and/or container developed is compliant with or compatible with a system). In at least one embodiment, an application that is developed may be tested locally (for example, at a first facility, on data from a first facility) with a SDK which may support at least some of services 1320 as a system (for example, system 1200 of FIG. 12). In at least one embodiment, because DICOM objects may contain anywhere from one to hundreds of images or other data types, and due to a variation in data, a developer may be responsible for managing (for example, setting constructs for, building pre-processing into an application, etc.) extraction and preparation of incoming data. In at least one embodiment, once validated by system 1300 (for example, for accuracy), an application may be available in a container registry for selection and/or implementation by a user to perform one or more processing tasks with respect to data at a facility (for example, a second facility) of a user.

In at least one embodiment, developers may then share applications or containers through a network for access and use by users of a system (for example, system 1300 of FIG. 13). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (for example, a cloud) to perform processing of data processing pipeline. In at least one embodiment, processing by deployment system 1306 may include referencing selected elements (for example, applications, containers, models, etc.) from a container registry and/or model registry 1324. In at least one embodiment, once results are generated by a pipeline, results may be returned to a user for reference (for example, for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, AI services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (for example, using a parallel computing platform). In at least one embodiment, rather than each application that shares a same functionality offered by services 1320 being required to have a respective instance of services 1320, services 1320 may be shared between and among various applications. In at least one embodiment, services 1320 may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (for example, DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional ("2D") and/or 3D models. In at least one embodiment, virtual instrument services may be included that provide for beam-forming, segmentation, inferencing, imaging, and/or support for other applications within pipelines of virtual instruments.

In at least one embodiment, where services 1320 includes an AI service (for example, an inference service), one or more machine learning models may be executed by calling upon (for example, as an API call) an inference service (for example, an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (for example, an AI supercomputer, such as NVIDIA's DGX Systems), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (for example, at facility(ies) 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (for example, hardware and software combination of NVIDIA's DGX Systems). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (for example, NVIDIA's NGC) may be executed using an AI/deep learning supercomputer(s) and/or GPU-optimized software (for example, as provided on NVIDIA's DGX Systems) as a hardware abstraction and scaling platform. In at least one embodiment, cloud platform may integrate an application container clustering system or orchestration system (for example, KUBERNETES) on multiple GPUs to allow seamless scaling and load balancing.

Figure 14:
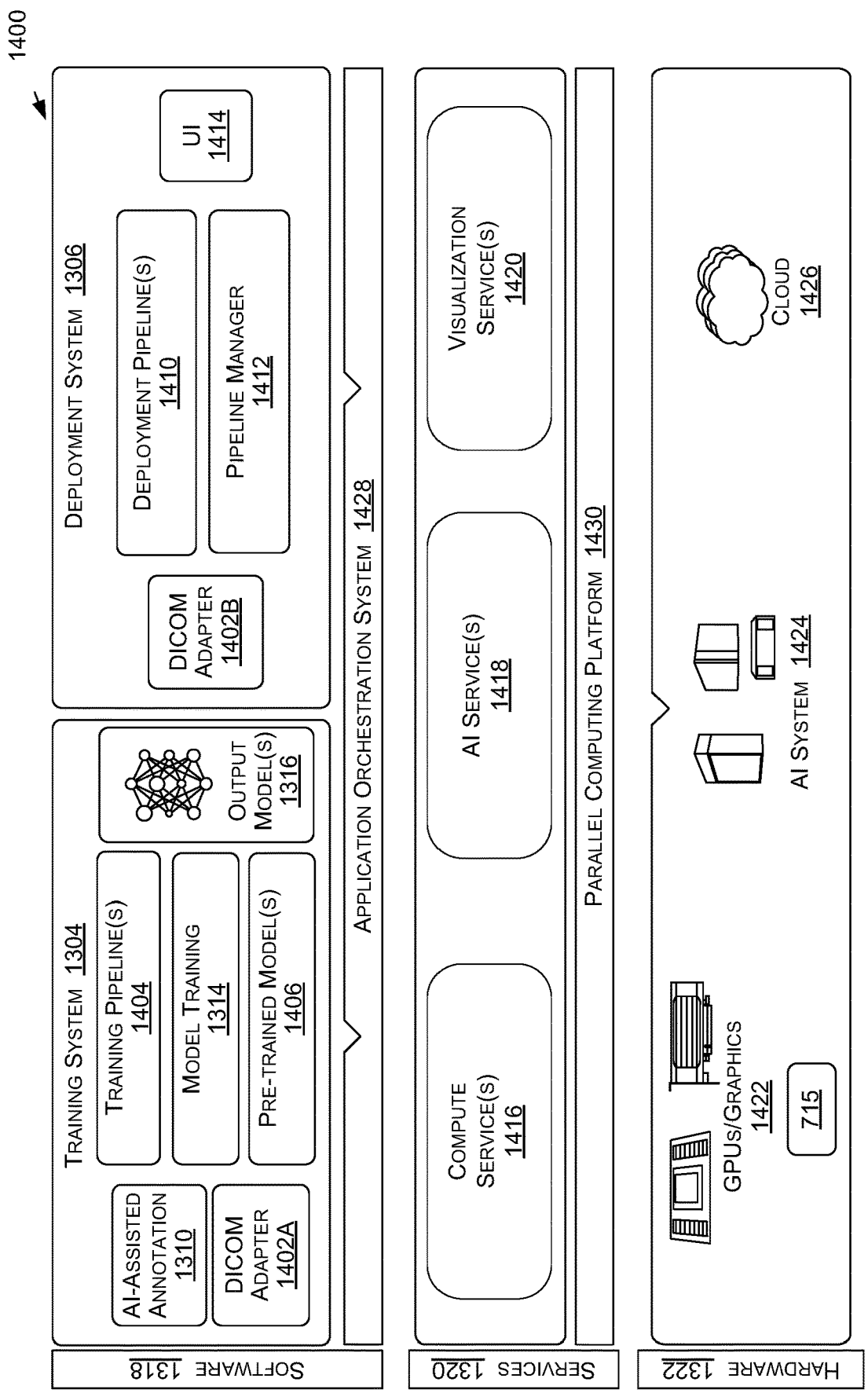
FIG. 14 is a system diagram for an example system for training, adapting, instantiating, and deploying machine learning models in an advanced computing pipeline, in accordance with at least one embodiment.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (for example, training system 1304 and/or deployment system 1306) may implemented in a cloud computing environment (for example, using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (for example, AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to LANs and/or WANs via wired and/or wireless communication protocols. In at least one embodiment, communication between facilities and components of system 1400 (for example, for transmitting inference requests, for receiving results of inference requests, etc.) may be communicated over data bus(ses), wireless data protocols (Wi-Fi), wired data protocols (for example, Ethernet), etc.

In at least one embodiment, training system 1304 may execute training pipeline(s) 1404, similar to those described herein with respect to FIG. 13. In at least one embodiment, where one or more machine learning models are to be used in deployment pipeline(s) 1410 by deployment system 1306, training pipeline(s) 1404 may be used to train or retrain one or more (for example, pre-trained) models, and/or implement one or more of pre-trained model(s) 1406 (for example, without a need for retraining or updating). In at least one embodiment, as a result of training pipeline(s) 1404, output model(s) 1316 may be generated. In at least one embodiment, training pipeline(s) 1404 may include any number of processing steps, such as but not limited to imaging data (or other input data) conversion or adaption In at least one embodiment, for different machine learning models used by deployment system 1306, different training pipeline(s) 1404 may be used. In at least one embodiment, training pipeline(s) 1404 similar to a first example described with respect to FIG. 13 may be used for a first machine learning model, training pipeline(s) 1404 similar to a second example described with respect to FIG. 13 may be used for a second machine learning model, and training pipeline(s)

1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines ("SVM"), Naïve Bayes, k-nearest neighbor ("Knn"), K means clustering, random forest, dimensionality reduction algorithms, gradient boosting algorithms, neural networks (for example, auto-encoders, convolutional, recurrent, perceptrons, Long/Short Term Memory ("LSTM"), Hopfield, Boltzmann, deep belief, deconvolutional, generative adversarial, liquid state machine, etc.), and/or other types of machine learning models.

In at least one embodiment, training pipeline(s) 1404 may include AI-assisted annotation, as described in more detail herein with respect to at least FIG. 14. In at least one embodiment, labeled data 1312 (for example, traditional annotation) may be generated by any number of techniques. In at least one embodiment, labels or other annotations may be generated within a drawing program (for example, an annotation program), a computer aided design ("CAD") program, a labeling program, another type of program suitable for generating annotations or labels for ground truth, and/or may be hand drawn, in some examples. In at least one embodiment, ground truth data may be synthetically produced (for example, generated from computer models or renderings), real produced (for example, designed and produced from real-world data), machine-automated (for example, using feature analysis and learning to extract features from data and then generate labels), human annotated (for example, labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation 1310 may be performed as part of deployment pipeline(s) 1410; either in addition to, or in lieu of AI-assisted annotation 1310 included in training pipeline(s) 1404. In at least one embodiment, system 1400 may include a multi-layer platform that may include a software layer (for example, software 1318) of diagnostic applications (or other application types) that may perform one or more medical imaging and diagnostic functions. In at least one embodiment, system 1400 may be communicatively coupled to (for example, via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (for example, called) from an external environment(s) (for example, facility(ies) 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner. In at least one embodiment, communications sent to, or received by, a training system 1304 and a deployment system 1306 may occur using a pair of DICOM adapters 1402A, 1402B.

In at least one embodiment, deployment system 1306 may execute deployment pipeline(s) 1410. In at least one embodiment, deployment pipeline(s) 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline(s) 1410 for an individual device may be referred to as a virtual instrument for a device (for example, a virtual ultrasound instrument, a virtual CT scan instrument, a virtual sequencing instrument, etc.). In at least one embodiment, for a single device, there may be more than one deployment pipeline(s) 1410 depending on information desired from data generated by a device. In at least one embodiment, where detections of anomalies are desired from an MRI machine, there may be a first deployment pipeline(s) 1410, and where image enhancement is desired from output of an MM machine, there may be a second deployment pipeline(s) 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipeline(s) 1410 may be even more user friendly, provide for easier integration, and produce more accurate, efficient, and timely results.

In at least one embodiment, deployment system 1306 may include a user interface ("UI") 1414 (for example, a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, UI 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to services 1320, and/or from application or service to hardware 1322. In at least one embodiment, although illustrated as included in software 1318, this is not intended to be limiting, and in some examples pipeline manager 1412 may be included in services 1320. In at least one embodiment, application orchestration system 1428 (for example, Kubernetes, DOCKER, etc.) may include a container orchestration system that may group applications into containers as logical units for coordination, management, scaling, and deployment. In at least one embodiment, by associating applications from deployment pipeline(s) 1410 (for example, a reconstruction application, a segmentation application, etc.) with individual containers, each application may execute in a self-contained environment (for example, at a kernel level) to increase speed and efficiency.

In at least one embodiment, each application and/or container (or image thereof) may be individually developed, modified, and deployed (for example, a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (for example, based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (for example, user constraints), such as quality of service (QoS), urgency of need for data outputs (for example, to determine whether to execute real-time processing or delayed processing), etc.

In at least one embodiment, services 1320 leveraged by and shared by applications or containers in deployment system 1306 may include compute service(s) 1416, AI service(s) 1418, visualization service(s) 1420, and/or other service types. In at least one embodiment, applications may call (for example, execute) one or more of services 1320 to perform processing operations for an application. In at least one embodiment, compute service(s) 1416 may be leveraged by applications to perform super-computing or other high-performance computing (HPC) tasks. In at least one embodiment, compute service(s) 1416 may be leveraged to perform parallel processing (for example, using a parallel computing platform 1430) for processing data through one or more of applications and/or one or more tasks of a single application, substantially simultaneously. In at least one embodiment, parallel computing platform 1430 (for example, NVIDIA's CUDA) may allow general purpose computing on GPUs ("GPGPU") (for example, GPUs/Graphics 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (for example, where multiple different stages of an application or multiple applications are processing same information). In at least one embodiment, rather than making a copy of data and moving data to different locations in memory (for example, a read/write operation), same data in same location of a memory may be used for any number of processing tasks (for example, at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI service(s) 1418 may be leveraged to perform inferencing services for executing machine learning model(s) associated with applications (for example, tasked with performing one or more processing tasks of an application). In at least one embodiment, AI service(s) 1418 may leverage AI system 1424 to execute machine learning model(s) (for example, neural networks, such as CNNs) for segmentation, reconstruction, object detection, feature detection, classification, and/or other inferencing tasks. In at least one embodiment, applications of deployment pipeline(s) 1410 may use one or more of output model(s) 1316 from training system 1304 and/or other models of applications to perform inference on imaging data. In at least one embodiment, two or more examples of inferencing using application orchestration system 1428 (for example, a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (for example, services 1320 and/or hardware 1322) based on priority paths for different inferencing tasks of AI service(s) 1418.

In at least one embodiment, shared storage may be mounted to AI service(s) 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (for example, for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (for example, shared storage), and/or a copy of a model may be saved to a cache. In at least one embodiment, a scheduler (for example, of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (for example, hosting an instance of an inference server) may be loaded (if not already), and a start procedure may be called. In at least one embodiment, pre-processing logic in a container may load, decode, and/or perform any additional pre-processing on incoming data (for example, using a CPU(s) and/or GPU(s)). In at least one embodiment, once data is prepared for inference, a container may perform inference as necessary on data. In at least one embodiment, this may include a single inference call on one image (for example, a hand X-ray), or may require inference on hundreds of images (for example, a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (for example, TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a SDK, and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization service(s) 1420 may be leveraged to generate visualizations for viewing outputs of applications and/or deployment pipeline(s) 1410. In at least one embodiment, GPUs/Graphics 1422 may be leveraged by visualization service(s) 1420 to generate visualizations. In at least one embodiment, rendering effects, such as ray-tracing, may be implemented by visualization service(s) 1420 to generate higher quality visualizations. In at least one embodiment, visualizations may include, without limitation, 2D image renderings, 3D volume renderings, 3D volume reconstruction, 2D tomographic slices, VR displays, AR displays, etc. In at least one embodiment, virtualized environments may be used to generate a virtual interactive display or environment (for example, a virtual environment) for interaction by users of a system (for example, doctors, nurses, radiologists, etc.). In at least one embodiment, visualization service(s) 1420 may include an internal visualizer, cinematics, and/or other rendering or image processing capabilities or functionality (for example, ray tracing, rasterization, internal optics, etc.).

In at least one embodiment, hardware 1322 may include GPUs/Graphics 1422, AI system 1424, cloud 1426, and/or any other hardware used for executing training system 1304 and/or deployment system 1306. In at least one embodiment, GPUs/Graphics 1422 (for example, NVIDIA's TESLA and/or QUADRO GPUs) may include any number of GPUs that may be used for executing processing tasks of compute service(s) 1416, AI service(s) 1418, visualization service(s) 1420, other services, and/or any of features or functionality of software 1318. For example, with respect to AI service(s) 1418, GPUs/Graphics 1422 may be used to perform pre-processing on imaging data (or other data types used by machine learning models), post-processing on outputs of machine learning models, and/or to perform inferencing (for example, to execute machine learning models). In at least one embodiment, cloud 1426, AI system 1424, and/or other components of system 1400 may use GPUs/Graphics 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (for example, a super-computer or an HPC) configured for inferencing, deep learning, machine learning, and/or other AI tasks. In at least one embodiment, AI system 1424 (for example, NVIDIA's DGX Systems) may include GPU-optimized software (for example, a software stack) that may be executed using a plurality of GPUs/Graph 1422, in addition to CPUs, RAM, storage, and/or other components, features, or functionality. In at least one embodiment, one or more AI systems 1424 may be implemented in cloud 1426 (for example, in a data center) for performing some or all of AI-based processing tasks of system 1400.

In at least one embodiment, cloud 1426 may include a GPU-accelerated infrastructure (for example, NVIDIA's NGC) that may provide a GPU-optimized platform for executing processing tasks of system 1400. In at least one embodiment, cloud 1426 may include an AI system(s) 1424 for performing one or more of AI-based tasks of system 1400 (for example, as a hardware abstraction and scaling platform). In at least one embodiment, cloud 1426 may integrate with application orchestration system 1428 leveraging multiple GPUs to allow seamless scaling and load balancing between and among applications and services 1320. In at least one embodiment, cloud 1426 may tasked with executing at least some of services 1320 of system 1400, including compute service(s) 1416, AI service(s) 1418, and/or visualization service(s) 1420, as described herein. In at least one embodiment, cloud 1426 may perform small and large batch inference (for example, executing NVIDIA's TENSOR RT), provide a parallel computing platform 1430 (for example, NVIDIA's CUDA), execute application orchestration system 1428 (for example, KUBERNETES), provide a graphics rendering API and platform (for example, for ray-tracing, 2D graphics, 3D graphics, and/or other rendering techniques to produce higher quality cinematics), and/or may provide other functionality for system 1400.

Figure 15A:
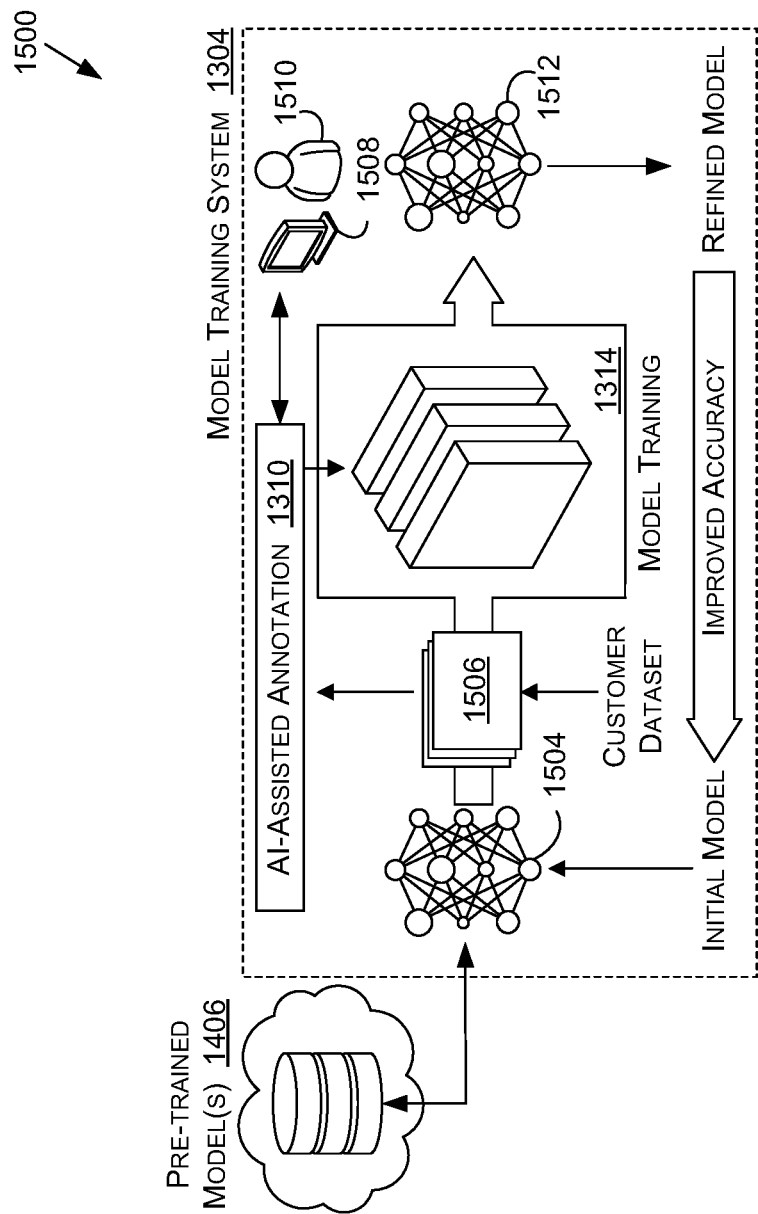

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services and/or hardware as described herein. In at least one embodiment, refined model 1512 generated by process 1500 may be executed by a deployment system for one or more containerized applications in deployment pipelines.

In at least one embodiment, model training 1514 may include retraining or updating an initial model 1504 (for example, a pre-trained model) using new training data (for example, new input data, such as customer dataset 1506, and/or new ground truth data associated with input data). In at least one embodiment, to retrain, or update, initial model 1504, output or loss layer(s) of initial model 1504 may be reset, deleted, and/or replaced with an updated or new output or loss layer(s). In at least one embodiment, initial model 1504 may have previously fine-tuned parameters (for example, weights and/or biases) that remain from prior training, so training or retraining may not take as long or require as much processing as training a model from scratch. In at least one embodiment, during model training 1514, by having reset or replaced output or loss layer(s) of initial model 1504, parameters may be updated and re-tuned for a new data set based on loss calculations associated with accuracy of output or loss layer(s) at generating predictions on new, customer dataset 1506.

In at least one embodiment, pre-trained model(s) 1406 may be stored in a data store, or registry. In at least one embodiment, pre-trained model(s) 1406 may have been trained, at least in part, at one or more facilities other than a facility executing process 1500. In at least one embodiment, to protect privacy and rights of patients, subjects, or clients of different facilities, pre-trained model(s) 1406 may have been trained, on-premise, using customer or patient data generated on-premise. In at least one embodiment, pre-trained model(s) 1406 may be trained using a cloud and/or other hardware, but confidential, privacy protected patient data may not be transferred to, used by, or accessible to any components of a cloud (or other off premise hardware). In at least one embodiment, where pre-trained model(s) 1406 is trained at using patient data from more than one facility, pre-trained model(s) 1406 may have been individually trained for each facility prior to being trained on patient or customer data from another facility. In at least one embodiment, such as where a customer or patient data has been released of privacy concerns (for example, by waiver, for experimental use, etc.), or where a customer or patient data is included in a public data set, a customer or patient data from any number of facilities may be used to train pre-trained model(s) 1406 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select pre-trained model(s) 1406 to use with an application. In at least one embodiment, pre-trained model may not be optimized for generating accurate results on customer dataset 1506 of a facility of a user (for example, based on patient diversity, demographics, types of medical imaging devices used, etc.). In at least one embodiment, prior to deploying a pre-trained model into a deployment pipeline for use with an application(s), pre-trained model(s) 1406 may be updated, retrained, and/or fine-tuned for use at a respective facility.

In at least one embodiment, a user may select pre-trained model(s) 1406 that is to be updated, retrained, and/or fine-tuned, and this pre-trained model may be referred to as initial model 1504 for a training system within process 1500. In at least one embodiment, a customer dataset 1506 (for example, imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by model training system 1304. In at least one embodiment, ground truth data may be generated, at least in part, by clinicians, scientists, doctors, practitioners, at a facility.

In at least one embodiment, AI-assisted annotation 1310 may be used in some examples to generate ground truth data. In at least one embodiment, AI-assisted annotation 1310 (for example, implemented using an AI-assisted annotation SDK) may leverage machine learning models (for example, neural networks) to generate suggested or predicted ground truth data for a customer dataset. In at least one embodiment, a user may use annotation tools within a user interface (a GUI) on a computing device.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (for example, from AI-assisted annotation 1310, manual labeling, etc.) may be used by during model training to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines at a facility for performing one or more processing tasks with respect to medical imaging data.

In at least one embodiment, refined model 1512 may be uploaded to pre-trained model(s) 1542 in a model registry to be selected by another facility. In at least one embodiment, this process may be completed at any number of facilities such that refined model 1512 may be further refined on new datasets any number of times to generate a more universal model.

FIG. 15B is an example illustration of a client-server architecture 1532 to enhance annotation tools with pre-trained model(s) 1542, in accordance with at least one embodiment. In at least one embodiment, AI-assisted annotation tool 1536 may be instantiated based on a client-server architecture 1532. In at least one embodiment, AI-assisted annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (for example, in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation, a deep learning model, for example, may receive this data as input and return inference results of a segmented organ or abnormality. In at least one embodiment, pre-instantiated annotation tools, such as AI-assisted annotation tool 1536 in FIG. 15B, may be enhanced by making API calls (for example, API Call 1544) to a server, such as an annotation assistant server 1540 that may include a set of pre-trained model(s) 1542 stored in an annotation model registry, for example. In at least one embodiment, an annotation model registry may store pre-trained model(s) 1542 (for example, machine learning models, such as deep learning models) that are pre-trained to perform AI-assisted annotation 1310 on a particular organ or abnormality. These models may be further updated by using training pipelines. In at least one embodiment, pre-installed annotation tools may be improved over time as new labeled data is added.

Various embodiments can be described by the following clauses:

1. A computer-implemented method, comprising:
   generating, using a first generative diffusion model, a shape latent representing a shape of a three-dimensional object;
   generating, using a second generative diffusion model and the shape latent, a set of latent points representative of latent features of the three-dimensional object;
   providing the shape latent and the set of latent points as input to a decoder network; and receiving, from the decoder network, a point cloud comprising a set of points representative of the three-dimensional object.
2. The computer-implemented method of clause 1, further comprising:
   generating, using the point cloud, a three-dimensional mesh for use in rendering a two-dimensional image of the three-dimensional object.
3. The computer-implemented method of clause 1, further comprising: providing the shape latent as a conditioning input to the second generative diffusion model.
4. The computer-implemented method of clause 1, further comprising: providing Gaussian noise as input to the first generative diffusion model.
5. The computer-implemented method of clause 1, wherein the shape latent is a one-dimensional, vector-valued global shape latent.
6. The computer-implemented method of clause 1, further comprising:
   training the first diffusion network using a set of shape latents of a first latent space generated using a hierarchical variational autoencoder (VAE) trained to generate shape latents from a set of input point clouds.
7. The computer-implemented method of claim 6, wherein the hierarchical variational autoencoder (VAE) is further trained to generate latent point clouds from the set of input point clouds, the method further comprising:
   training the second diffusion network using a set of latent point clouds of a second latent space generated using the hierarchical variational autoencoder (VAE).
8. The computer-implemented method of clause 1, wherein the three-dimensional object is determined unconditionally from one of a set of object classes on which at least the first diffusion network was trained.
9. The computer-implemented method of clause 1, further comprising:
   providing, as input to an encoder, a voxel-based representation of the three-dimensional object in order to weakly condition at least the first diffusion network to generate the shape latent approximating the voxel-based representation.
10. The computer-implemented method of clause 1, further comprising:
    providing, as input to an encoder, a noisy input shape in order to weakly condition at least the first diffusion network to generate the shape latent approximating the noisy input shape.
11. The computer-implemented method of clause 1, further comprising:
    providing, as input to the first diffusion network, a text encoding in order to condition at least the first diffusion network to generate the shape latent based in part on text used to generate the text encoding.
12. The computer-implemented method of clause 1, further comprising:
    manipulating one or more of the shape latent or the latent point cloud in order to modify the point cloud to be received from the decoder.
13. A processor, comprising:
    one or more circuits to:
    generate, using a first generative diffusion model, a shape latent representing a shape of a three-dimensional object;
    generate, using a second generative diffusion model and the shape latent, a latent point cloud representative of latent features of the three-dimensional object;
    provide the shape latent and the latent point cloud as input to a decoder network; and
    receive, from the decoder network, a point cloud comprising a set of points representative of the three-dimensional object.

14. The processor of clause 13, wherein the one or more circuits are further to provide the shape latent as a conditioning input to the second generative diffusion model, wherein the shape latent is a one-dimensional, vector-valued global shape latent.

15. The processor of clause 13, wherein the one or more circuits are further to train the first diffusion network using a set of shape latents of a first latent space, and to train the second diffusion network using a set of latent point clouds of a second latent space, generated using a hierarchical variational autoencoder (VAE).

16. The processor of clause 13, wherein the processor is comprised in at least one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for performing generative content operations using a language model;
a system for synthetic data generation;
a system for performing generative AI operations using a large language model (LLM),
a collaborative content creation platform for 3D assets; or
a system implemented at least partially using cloud computing resources.

17. A system, comprising:
one or more processors to generate a point cloud representing a random three-dimensional object from a set of object classes, the point cloud generated using a shape latent determined using a first generative diffusion network and a set of latent points determined using a second generative diffusion network.

18. The system of clause 17, wherein the one or more processors are further to provide the shape latent as a conditioning input to the second generative diffusion model, wherein the shape latent is a one-dimensional, vector-valued global shape latent.

19. The system of clause 17, wherein the one or more processors are further to train the first diffusion network using a set of shape latents of a first latent space, and to train the second diffusion network using a set of latent point clouds of a second latent space, generated using a hierarchical variational autoencoder (VAE).

20. The system of clause 17, wherein the system comprises at least one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system for performing generative AI operations using a large language model (LLM),
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for performing generative content operations using a language model;
a system for synthetic data generation;
a collaborative content creation platform for 3D assets; or
a system implemented at least partially using cloud computing resources.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (for example, "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (for example, "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (for example, executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (for example, a propagating transient electric or electromagnetic transmission) but includes non-transitory data storage circuitry (for example, buffers, cache, and queues) within transceivers of transitory signals. In at least one embodiment, code (for example, executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main CPU executes some of instructions while a GPU executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (for example, "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an API or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
   generating, using a first generative diffusion model, a shape latent representing a shape of a three-dimensional object;
   generating, using a second generative diffusion model and the shape latent, a set of latent points representative of latent features of the three-dimensional object;
   providing the shape latent and the set of latent points as input to a decoder network; and
   receiving, from the decoder network, a point cloud comprising a set of points representative of the three-dimensional object.

2. The computer-implemented method of claim 1, further comprising:
   generating, using the point cloud, a three-dimensional mesh for use in rendering a two-dimensional image of the three-dimensional object.

3. The computer-implemented method of claim 1, further comprising:
   providing the shape latent as a conditioning input to the second generative diffusion model.

4. The computer-implemented method of claim 1, further comprising:
   providing Gaussian noise as input to the first generative diffusion model.

5. The computer-implemented method of claim 1, wherein the shape latent is a one-dimensional, vector-valued global shape latent.

6. The computer-implemented method of claim 1, further comprising:
   training the first generative diffusion model using a set of shape latents of a first latent space generated using a hierarchical variational autoencoder (VAE) trained to generate shape latents from a set of input point clouds.

7. The computer-implemented method of claim 6, wherein the hierarchical variational autoencoder (VAE) is further trained to generate latent point clouds from the set of input point clouds, the method further comprising:
   training the second generative diffusion model using a set of latent point clouds of a second latent space generated using the hierarchical variational autoencoder (VAE).

8. The computer-implemented method of claim 1, wherein the three-dimensional object is determined unconditionally from one of a set of object classes on which at least the first generative diffusion model was trained.

9. The computer-implemented method of claim 1, further comprising:
   providing, as input to an encoder, a voxel-based representation of the three-dimensional object in order to condition at least the first generative diffusion model to generate the shape latent approximating the voxel-based representation.

10. The computer-implemented method of claim 1, further comprising:
    providing, as input to an encoder, a noisy input shape in order to condition at least the first generative diffusion model to generate the shape latent approximating the noisy input shape.

11. The computer-implemented method of claim 1, further comprising:
    providing, as input to the first generative diffusion model, a text encoding in order to condition at least the first generative diffusion model to generate the shape latent based in part on text used to generate the text encoding.

12. The computer-implemented method of claim 7, further comprising:
    manipulating one or more of the shape latent or the latent point cloud in order to modify the point cloud to be received from the decoder.

13. A processor, comprising:
    one or more circuits to:
      generate, using a first generative diffusion model, a shape latent representing a shape of a three-dimensional object;
      generate, using a second generative diffusion model and the shape latent, a latent point cloud representative of latent features of the three-dimensional object;
      provide the shape latent and the latent point cloud as input to a decoder network; and
      receive, from the decoder network, a point cloud comprising a set of points representative of the three-dimensional object.

14. The processor of claim 13, wherein the one or more circuits are further to provide the shape latent as a conditioning input to the second generative diffusion model, wherein the shape latent is a one-dimensional, vector-valued global shape latent.

15. The processor of claim 13, wherein the one or more circuits are further to train the first generative diffusion model using a set of shape latents of a first latent space, and to train the second generative diffusion model using a set of latent point clouds of a second latent space, generated using a hierarchical variational autoencoder (VAE).

16. The processor of claim 13, wherein the processor is comprised in at least one of:
    a system for performing simulation operations;
    a system for performing simulation operations to test or validate autonomous machine applications;
    a system for performing digital twin operations;
    a system for performing light transport simulation;
    a system for rendering graphical output;
    a system for performing deep learning operations;
    a system implemented using an edge device;
    a system for generating or presenting virtual reality (VR) content;
    a system for generating or presenting augmented reality (AR) content;
    a system for generating or presenting mixed reality (MR) content;
    a system incorporating one or more Virtual Machines (VMs);
    a system implemented at least partially in a data center;
    a system for performing hardware testing using simulation;
    a system for performing generative content operations using a language model;
    a system for synthetic data generation;
    a system for performing generative AI operations using a large language model (LLM),
    a collaborative content creation platform for 3D assets; or
    a system implemented at least partially using cloud computing resources.

17. A system, comprising:

one or more processors to generate a point cloud representing a random three-dimensional object from a set of object classes, the point cloud generated using a shape latent determined using a first generative diffusion network and a set of latent points determined using a second generative diffusion network.

18. The system of claim 17, wherein the one or more processors are further to provide the shape latent as a conditioning input to the second generative diffusion model, wherein the shape latent is a one-dimensional, vector-valued global shape latent.

19. The system of claim 17, wherein the one or more processors are further to train the first diffusion network using a set of shape latents of a first latent space, and to train the second diffusion network using a set of latent point clouds of a second latent space, generated using a hierarchical variational autoencoder (VAE).

20. The system of claim 17, wherein the system comprises at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system for performing generative AI operations using a large language model (LLM), a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for performing generative content operations using a language model;

a system for synthetic data generation;

a collaborative content creation platform for 3D assets; or a system implemented at least partially using cloud computing resources.

* * * * *